(12) United States Patent
Nishimura et al.

(10) Patent No.: US 6,583,594 B2
(45) Date of Patent: Jun. 24, 2003

(54) ELECTRIC POWER STEERING APPARATUS

(75) Inventors: Hiroshi Nishimura, Tokyo (JP); Shigeki Ohtagaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/862,703

(22) Filed: May 23, 2001

(65) Prior Publication Data

US 2002/0047677 A1 Apr. 25, 2002

(30) Foreign Application Priority Data

Oct. 25, 2000 (JP) ........................................ 2000-326012

(51) Int. Cl.[7] ................................................ G05B 5/00
(52) U.S. Cl. ........................ 318/466; 318/432; 318/434
(58) Field of Search ................................. 318/434, 429, 318/432, 446, 489, 466; 180/443, 446, 404

(56) References Cited

U.S. PATENT DOCUMENTS

| 5,485,067 A | | 1/1996 | Nishimoto et al. | |
|---|---|---|---|---|
| 5,602,735 A | * | 2/1997 | Wada | 180/446 |
| 6,041,884 A | * | 3/2000 | Shimizu et al. | 180/443 |
| 6,332,506 B1 | * | 12/2001 | Kifuku | 180/443 |

* cited by examiner

*Primary Examiner*—Khanh Dang
(74) *Attorney, Agent, or Firm*—Sughrue Mion, PLLC

(57) ABSTRACT

In conventional electric power steering apparatus, a problem exists in that whether or not there is any failure in drive inhibiting means may be erroneously judged, and that it is impossible to judge whether or not a drive inhibition signal is normal. A steering torque detected by a torque sensor and a motor current outputted by motor drive means 5 using a motor drive signal formed by CPU 13 based on the steering torque are inputted to drive inhibiting means 14. The drive inhibiting means 14 outputs a drive inhibition signal and a drive inhibition switch signal based on the relation between the inputted two signals. CPU 13 detects that there is a failure in the drive inhibiting means 14 based on the outputted signals. Upon detecting a failure, a control is conducted so that the motor current is set to 0.

18 Claims, 22 Drawing Sheets

Fig. 2

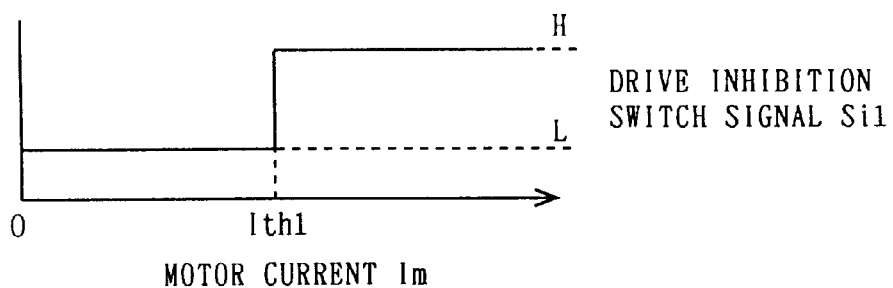

Fig. 3

| DRIVE INHIBITON SIGNAL | | DRIVING DIRECTION OF MOTOR DRIVE SIGNAL Sm | MOTOR CURRENT Im |
|---|---|---|---|
| InhR | InhL | | |
| INHIBITED | INHIBITED | RIGHTWARD | 0 |
| INHIBITED | INHIBITED | LEFTWARD | 0 |
| AUTHORIZED | INHIBITED | RIGHTWARD | OUTPUTTED |
| AUTHORIZED | INHIBITED | LEFTWARD | 0 |
| INHIBITED | AUTHORIZED | RIGHTWARD | 0 |
| INHIBITED | AUTHORIZED | LEFTWARD | OUTPUTTED |
| AUTHORIZED | AUTHORIZED | RIGHTWARD | OUTPUTTED |
| AUTHORIZED | AUTHORIZED | LEFTWARD | OUTPUTTED |

Fig. 8
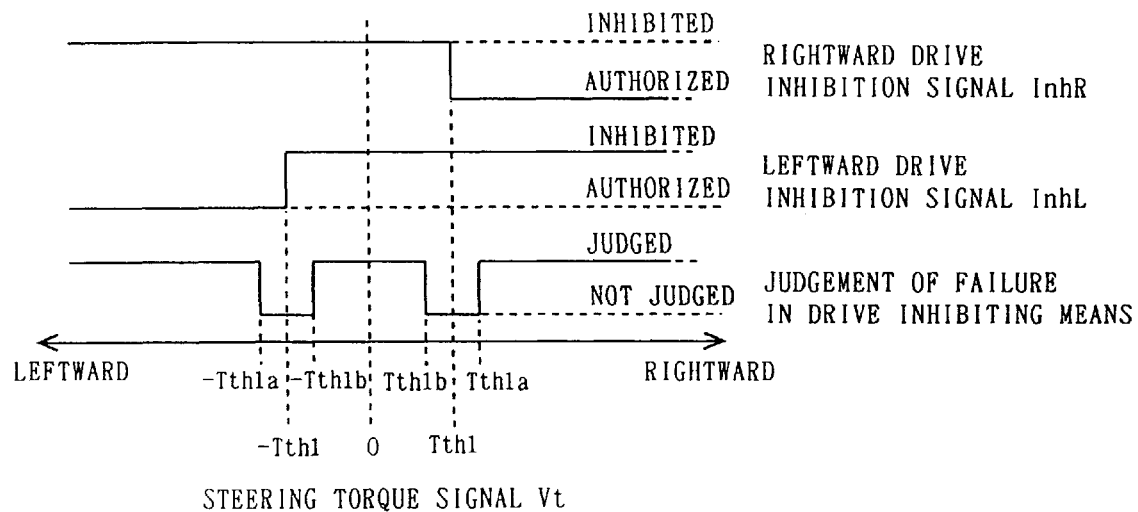
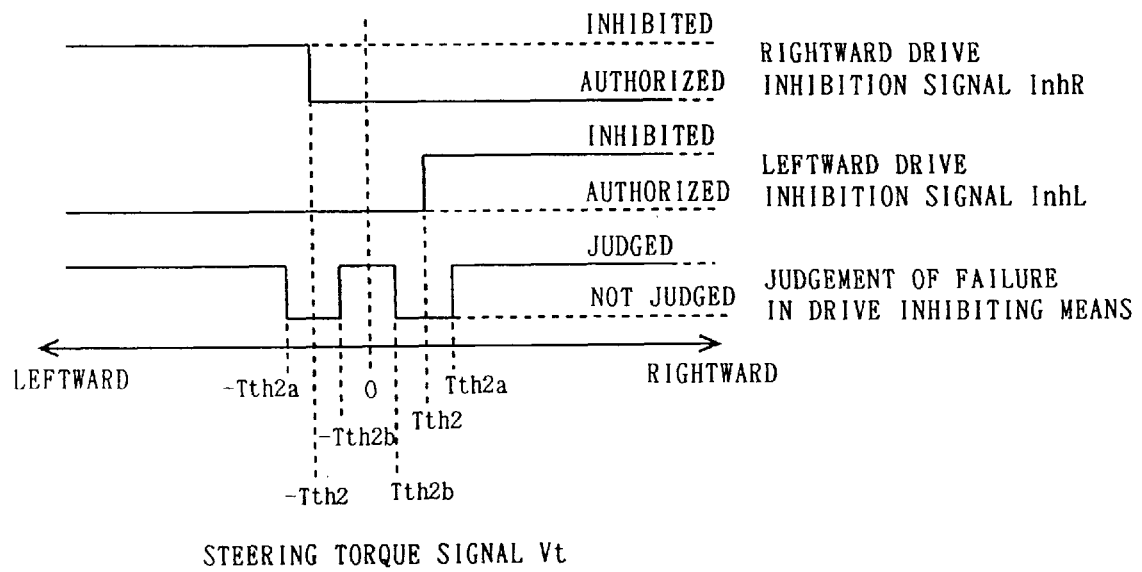

Fig. 21

PRIOR ART

| DRIVE INHIBITON SIGNAL | | DRIVING DIRECTION OF MOTOR DRIVE SIGNAL Sm | MOTOR CURRENT Im |
|---|---|---|---|
| InhR | InhL | | |
| INHIBITED | AUTHORIZED | RIGHTWARD | 0 |
| INHIBITED | AUTHORIZED | LEFTWARD | OUTPUTTED |
| INHIBITED | INHIBITED | RIGHTWARD | 0 |
| INHIBITED | INHIBITED | LEFTWARD | 0 |
| AUTHORIZED | INHIBITED | RIGHTWARD | OUTPUTTED |
| AUTHORIZED | INHIBITED | LEFTWARD | 0 |

Fig. 25
PRIOR ART
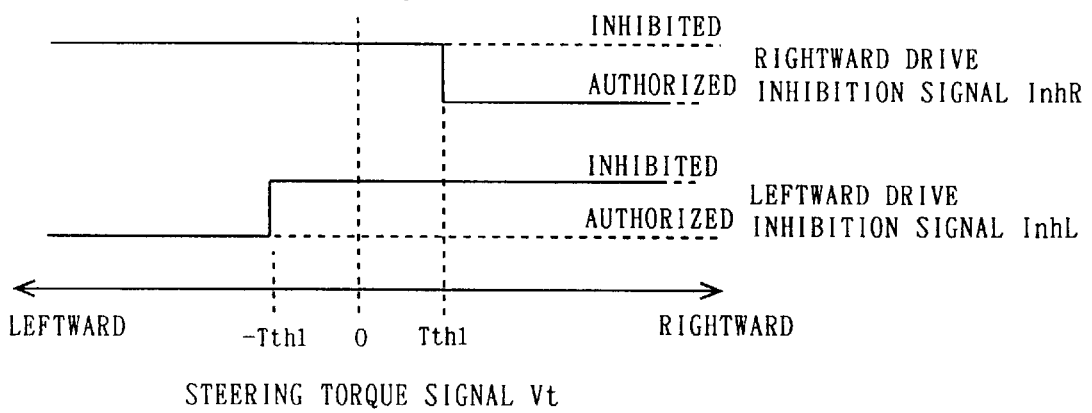
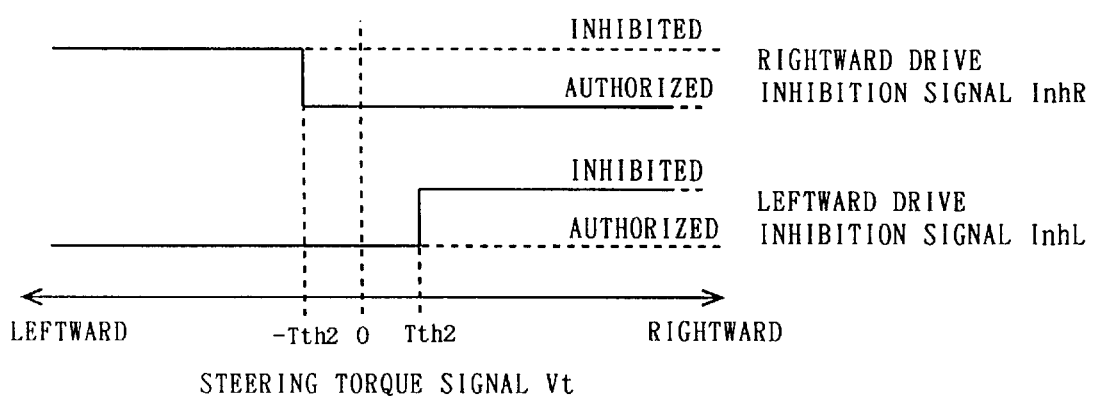

ELECTRIC POWER STEERING APPARATUS

BACKGROUND OF THE INVENTION

1. Technical Field

The present invention relates to an electric power steering apparatus for assisting steering force by power of a motor.

2. Background Art

FIG. 18 is a control block diagram of a conventional electric power steering apparatus disclosed in, for example, Japanese Patent Publication (unexamined) No. 17424/1995.

In FIG. 18, reference numeral 1 is a torque sensor for outputting. a steering torque of a driver as a steering torque signal Vt, and numeral 2 is a speed sensor for outputting a speed of a vehicle as a speed signal Vs. Numeral 3 is a CPU for outputting a motor drive signal Sm corresponding to an inputted signal such as the steering torque signal Vt and detecting failure in the electric power steering apparatus, and numeral 4 is drive inhibiting means for judging a direction of inhibiting drive of the motor corresponding to the steering torque signal Vt and outputting a rightward drive inhibition signal InhR and a leftward drive inhibition signal InhL. Numeral 5 is motor driving means outputting a motor current Im corresponding to the value of the motor drive signal Sm, the right drive inhibition signal InhR, and the left drive inhibition signal InhL, and numeral 6 is a motor for generating a steering assist force corresponding to the motor current Im.

FIG. 19 is a diagram showing the mentioned conventional electric power steering apparatus in the form of whole constitution.

In FIG. 19, numerals 1, 2, and 6 are the same as those in FIG. 18. Numeral 7 is a steering wheel, numeral 8 is a steering shaft, numeral 9 is a reduction gear for transmitting the outputted torque of the motor 6 to the steering shaft 8, numeral 10 is a controller for driving the motor 6 on the basis of signals inputted from the torque sensor 1 and the speed sensor 2, and numeral 11 is a battery for serving as a power source of the controller 10.

FIG. 20 is a diagram showing a characteristic of the drive inhibiting means in the conventional electric power steering apparatus.

In FIG. 20, in a case that the steering torque signal Vt is larger than a threshold value Tth1, i.e., in the case that steering to the right is conducted, the rightward drive inhibition signal InhR is authorized, while the leftward drive inhibition signal InhL is inhibited. In the case that the steering torque signal Vt is smaller than a threshold value −Tth1, i.e., in the case that steering to the left is conducted, the rightwad drive inhibition signal InhR is inhibited and the leftward drive inhibition signal InhL is authorized. It is established that the drive inhibition signals InhR and InhL are both inhibited in the case that the steering torque signal Vt is not more than the threshold value Tth1 and not less than the threshold value −Tth1, i.e., in the case that steering is not operated or steering is operated with a very small steering force.

FIG. 21 is a table showing the conditions of outputting a motor current in the conventional electric power steering apparatus.

FIG. 22 is a flow diagram showing a process of judging whether or not there is any failure in the drive inhibiting means of the conventional electric power steering apparatus.

FIG. 23 is a graph showing operation of the controller when it is judged that there is any failure in the drive inhibiting means of the conventional electric power steering apparatus.

Described below is operation of the foregoing conventional electric power steering apparatus.

The torque sensor 1 determines the steering torque of the driver and outputs the steering torque signal Vt. The speed sensor 2 determines the speed of the vehicle and outputs the speed signal Vs. The CPU 3 outputs the motor drive signal Sm of a predetermined characteristic corresponding to the steering torque signal Vt and the speed signal Vs. The drive inhibiting means 4 outputs the drive inhibition signals InhR and InhL of predetermined characteristics corresponding to the steering torque signal Vt. The motor driving means 5 outputs the motor current Im driving the motor 6 corresponding to the motor drive signal Sm and the drive inhibition signals InhR and InhL.

As shown in FIG. 21, the motor driving means 5 outputs the motor current Im corresponding to the motor drive signal Sm in the case that the driving direction of the motor drive signal Sm is not inhibited by the drive inhibition signal InhR or InhL. On the dother hand, in the case that the driving direction is inhibited by the drive inhibition signal InhR or InhL, the motor current Im is set to 0. The motor 6 outputs the steering assist force corresponding to the motor current Im, thereby reducing the steering force of the driver.

In the case that the CPU 3 fails and is in a failure mode wherein the motor drive signal Sm is outputted regardless of the steering torque signal Vt, the output of the motor 6 in the direction opposite to the steering torque signal Vt is inhibited when the driver is steering the vehicle. Therefore it is possible to prevent increase in steering force of the driver caused by the motor 6. Moreover, when the driver is not steering the vehicle, the output of the motor 6 in both directions is inhibited, and therefore it is possible to prevent undesirable self-turning of the steering.

As shown in FIG. 22, whether or not there is any failure in the drive inhibiting means 4 is judged by comparing the state of the steering torque signal Vt with that of the drive inhibition signals InhR and InhL.

In FIG. 22, in step S1, the absolute value of the steering torque signal Vt and the threshold value Tth1 are compared with each other, and when it is judged that the absolute value of the steering torque signal Vt is not larger than the threshold value Tth1, the drive inhibition signals InhR and InhL are monitored in step S2 and step S3. If at least one of the drive inhibition signals InhR and InhL is authorized, the process proceeds to step S7, where it is judged that there is any failure in the drive inhibiting means 4.

In the case that it is judged in the step S1 that the absolute value of the steering torque signal Vt is larger than the threshold value Tth1, the process proceeds to step S4 to judge the direction of the steering torque signal Vt. If the direction is judged rightward, the process proceeds to step S5 to monitor the leftward drive inhibition signal InhL. If the signal is authorized, the process proceeds to step S7 to judge that there is any failure in the drive inhibiting means 4. In the case that the direction of the steering torque signal Vt is judged leftward, the process proceeds to step S6 to monitor the rightward drive inhibition signal InhR. If the signal is authorized, the process proceeds to the step S7 to judge that there is any failure in the drive inhibiting means 4.

As a result of the foregoing processing, if it is judged that there is any failure, occurrence of the failure is definitely concluded, and the motor current Im is set to 0 in order to interrupt the drive of the motor 6 as shown in FIG. 23.

As described above, the electric power steering apparatus for reducing the steering torque of the driver is achieved in the conventional apparatus by driving the motor 6 corresponding to the steering force of the driver and generating the steering assist force.

In the case that the CPU 3 fails and outputs the motor drive signal Sm regardless of the steering torque signal Vt, the drive inhibiting means 4 restricts the output of the motor 6, whereby it is possible to prevent undesirable self-turning of the steering.

In the case that the CPU 3 judges that the drive inhibiting means 4 fails and can not restrict the output of the motor 6, the drive of the motor 6 is interrupted, whereby safety is assured against a failure mode in which the CPU 3 fails after the failure of the drive inhibiting means 4.

FIG. 24 is a control block diagram showing a further conventional electric power steering apparatus disclosed in, for example, Japanese Patent Publication (unexamined) No. 315330/1997.

In FIG. 24, numeral 12 is drive inhibiting means for judging the direction of inhibiting the drive of the motor corresponding to the steering torque signal Vt and the motor current Im and outputting the rightward drive inhibition signal InhR and the leftward drive inhibition signal InhL.

FIG. 25 shows a characteristic of the drive inhibiting means in this conventional electric power steering apparatus in which characteristic of the drive inhibiting means is changed by the motor current.

Referring to FIG. 25, in the case that the motor current Im is larger than a threshold value Ith1, the characteristic is the same as that in the foregoing drive inhibiting means 4. However, in the case that the motor current Im is not larger than the threshold value Ith1, it is established that the drive inhibition signals InhR and InhL are authorized when the steering torque signal Vt is not more than a threshold value Tth2 and mot more than a threshold value −Tth2, i.e., when steering is not operated or steering is operated with a very small steering force.

In the conventional method for judging any failure in the drive inhibiting means 4 shown in FIG. 22, whether or not there is any failure is judged from the drive inhibition signals InhR and InhL regardless of the motor current Im. Accordingly, a problem exists in that, in case of combining the method with, for example, the drive inhibiting means 12 having the characteristic shown in FIG. 25, when the motor current Im is not more than the threshold value Ith1 and the steering torque signal Vt is not more than the threshold value Tth2, the drive inhibition signals InhR and InhL are authorized, and therefore it is mistakenly judged that there is a failure in the drive inhibiting means 12.

Another problem exists in that it is not possible to judge whether or not the characteristic of the drive inhibiting means 12 is appropriately switched corresponding to the motor current Im.

SUMMARY OF THE INVENTION

The present invention was made to solve the above-discussed problems and has an object of obtaining an electric power steering apparatus in which it is possible to detect a failure even if the apparatus is provided with drive inhibiting means whose characteristic is changed corresponding to a motor current Im.

An electric power steering apparatus according to the invention comprises: drive inhibiting means for outputting a drive inhibition signal to restrict drive of a motor according to a relation between a steering torque and a motor current; and failure detecting means for detecting a failure in the drive inhibiting means according to the relation between the steering torque and the motor current using the drive inhibition signal outputted by the drive inhibiting means.

As a result, it is possible to detect any failure in the drive inhibiting means restricting the drive of the motor according to the relation between the steering torque and the motor current.

It is also preferable that the drive inhibiting means outputs a drive inhibition switch signal corresponding to the relation between the steering torque and the motor current to the failure detecting means, and the failure detecting means detects a failure corresponding to the drive inhibition switch signal.

As a result, it is possible to detect a failure of the drive inhibition switch signal using the drive inhibition switch signal.

It is also preferable that the failure detecting means does not detect a failure when the drive inhibition switch signal and the drive inhibition signal satisfy predetermined conditions.

As a result, it is possible to simplify the failure detecting process.

It is also preferable that the failure detecting means does not detect a failure when the drive inhibition switch signal outputted by the drive inhibiting means is within a predetermined range.

As a result, it is possible to simplify the detecting process.

It is also preferable that the failure detecting means detects abnormality of the drive inhibition switch signal in association with the motor current.

As a result, it is possible to detect abnormality of the drive inhibition switch signal.

It is also preferable that the failure detecting means does not detect abnormality of the drive inhibition switch signal when the motor current is smaller than a predetermined value.

As a result, it is possible to simplify the failure detecting process.

It is also preferable that the failure detecting means does not detect a failure when the motor current is within a predetermined range near a switching point where the drive inhibition switch signal is inverted.

As a result, it is possible to reduce erroneous failure detection.

It is also preferable that the relation between the steering torque and the motor current is switched corresponding to the motor current, and the failure detecting means detects a failure corresponding to the motor current reflecting the state of switching the relation between the steering torque and the motor current.

As a result, it is possible to detect a failure in the drive inhibiting means using the motor current.

It is also preferable that the failure detecting means does not detect a failure when the motor current and the drive inhibition signal satisfy predetermined conditions.

As a result, it is possible to simplify the failure detecting process.

It is also preferable that the failure detecting means does not detect a failure when the motor current is within a predetermined range.

As a result, it is possible to simplify the failure detecting process.

It is also preferable that the relation between the steering torque and the motor current is established so as to authorize driving of the motor when the motor current is small.

As a result, it is possible to generate the steering assist force even if the motor current is small.

It is also preferable that the failure detecting means does not detect a failure when the steering torque is within a predetermined range.

As a result, it is possible to reduce erroneous failure detection.

It is also preferable that the failure detecting means reduces output of the motor when a failure is detected.

As a result, safety at the time of actually occurring a failure is assured.

It is also preferable that the failure detecting means concludes definitely that there is a failure when the failure is continuously detected for more than a certain time, and reduces output of the motor when occurrence of the failure is definitely concluded.

As a result, it is possible to prevent erroneous judgment that there is any failure due to noises and assure safety at the time of definite occurrence of the failure.

It is also preferable that the failure detecting means interrupts output of the motor when the motor current is reduced.

As a result, it is possible to prevent a rapid increase in steering force of the driver.

It is also preferable that the failure detecting means reduces gradually output of the motor.

As a result, safety of the apparatus is assured.

It is also preferable that the apparatus is provided with a memory for storing and holding results detected by the failure detecting means.

As a result, the apparatus becomes more highly reliable.

It is also preferable that the memory is a nonvolatile memory. As a result, it is possible to store the detection results even after interrupting the power source.

BRIEF DESCRIPTION OF THE DRAWINGS

FIG. 2 is a diagram showing the state of the characteristic of the drive inhibiting means in the electric power steering apparatus according to Embodiment 1 of the invention.

FIG. 3 is a diagram showing the conditions of outputting the motor current in the electric power steering apparatus according to Embodiment 1 of the invention.

FIG. 8 is a diagram showing a range within which no judgment is made on whether or not there is a failure in the drive inhibiting means in the electric power steering apparatus according to Embodiment 5 of the invention.

FIG. 21 is a table showing the conditions of outputting the motor current in the conventional electric power steering apparatus.

FIG. 25 is a diagram showing the characteristic of the drive inhibiting means of the conventional electric power steering apparatus in which the characteristic of the drive inhibiting means is changed by the motor current.

DESCRIPTION OF THE PREFERRED EMBODIMENTS

Embodiment 1

Several preferred embodiments of the invention are hereinafter described.

Figure 1:
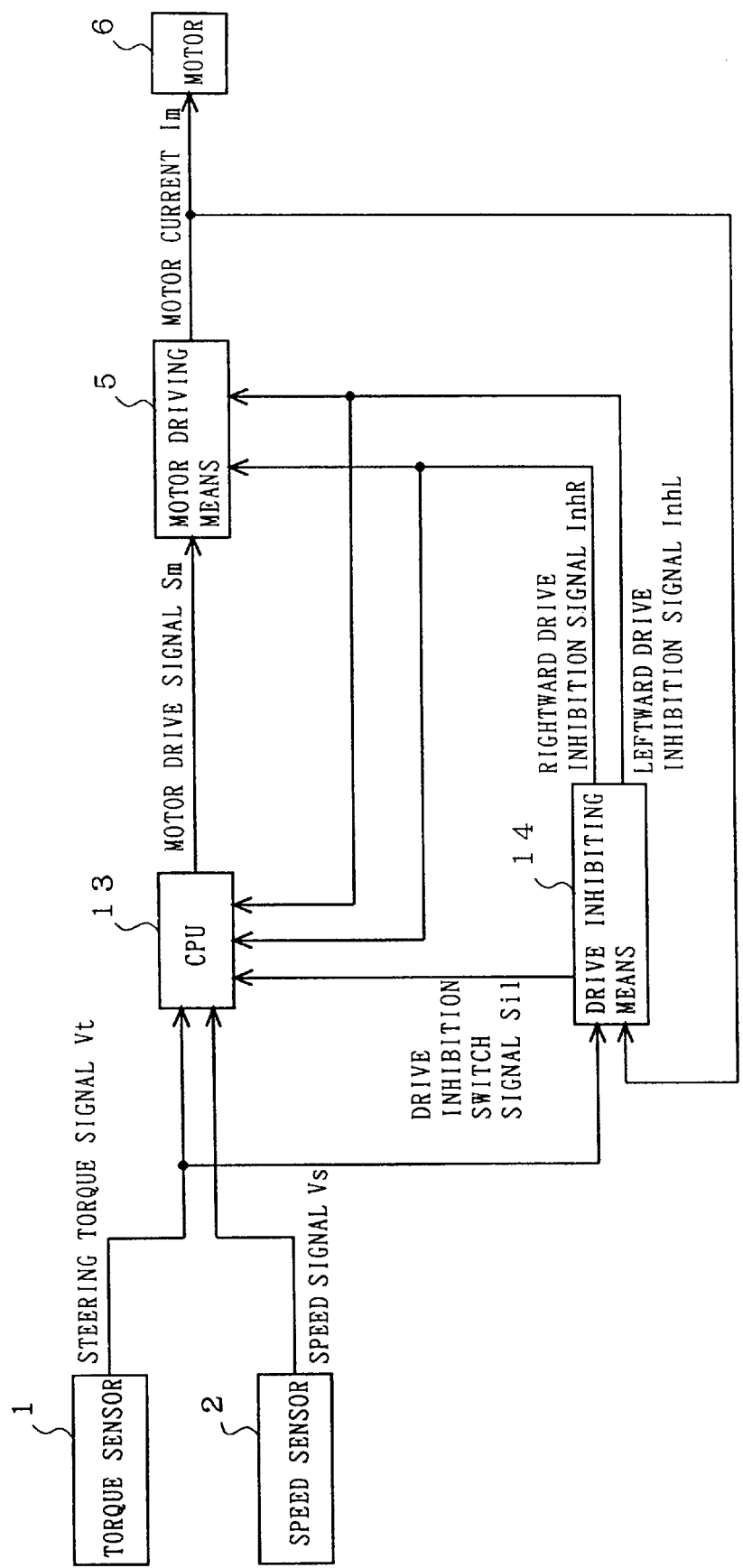
FIG. 1 is a control block diagram showing the electric power steering apparatus according to Embodiment 1 of the invention.
Figure 19:
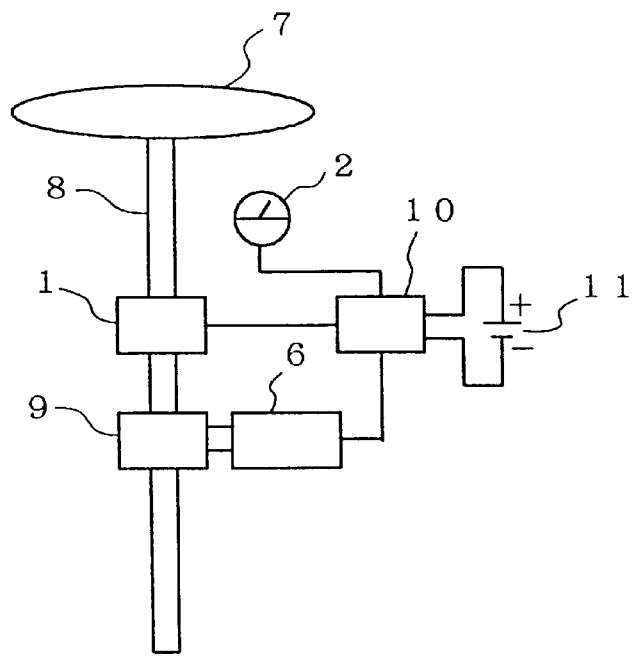
FIG. 19 is a diagram showing the conventional electric power steering apparatus in the form of whole constitution.

FIG. 1 is a control block diagram showing the electric power steering apparatus according to Embodiment 1 of the invention. The fundamental construction is the same as that in the controller 10 of the conventional electric power steering apparatus, and the diagram of the electric power steering apparatus in the form of whole constitution is the same as that of the conventional electric power steering apparatus shown in FIG. 19.

Referring to FIG. 1, reference numeral 1 is a torque sensor forming steering torque detecting means for outputting the steering torque of the driver as a steering torque signal Vt, and numeral 2 is a speed sensor outputting the speed of the vehicle as a speed signal Vs. Numeral 5 is motor driving means for outputting a motor current Im corresponding to the value of a motor drive signal Sm, a right drive inhibition signal InhR, and a left drive inhibition signal InhL described later. Numeral 6 is a motor for generating steering assist force corresponding to the motor current Im. Numeral 13 is a CPU for outputting the motor drive signal Sm corresponding to an inputted signal such as the steering torque signal Vt, and having failure detecting means for detecting failure in the electric power steering apparatus. Numeral 14 is drive inhibiting means for judging the direction of inhibiting the drive of the motor corresponding to the steering torque signal Vt and the motor current Im outputted by the motor driving means 5, and outputting the right drive inhibition signal InhR, the left drive inhibition signal InhL, and a drive inhibition switch signal Sil.

To the failure detecting means of the CPU 13, the drive inhibition switch signal Sil showing the state of switching the characteristic of the drive inhibiting means 14 is inputted in order to judge whether or not there is any failure in the drive inhibiting means 14. In the detection, the right drive inhibition signal InhR and the left drive inhibition signal InhL outputted by the drive inhibiting means 14 are used to detect the failure in the drive inhibiting means 14.

Figure 18:
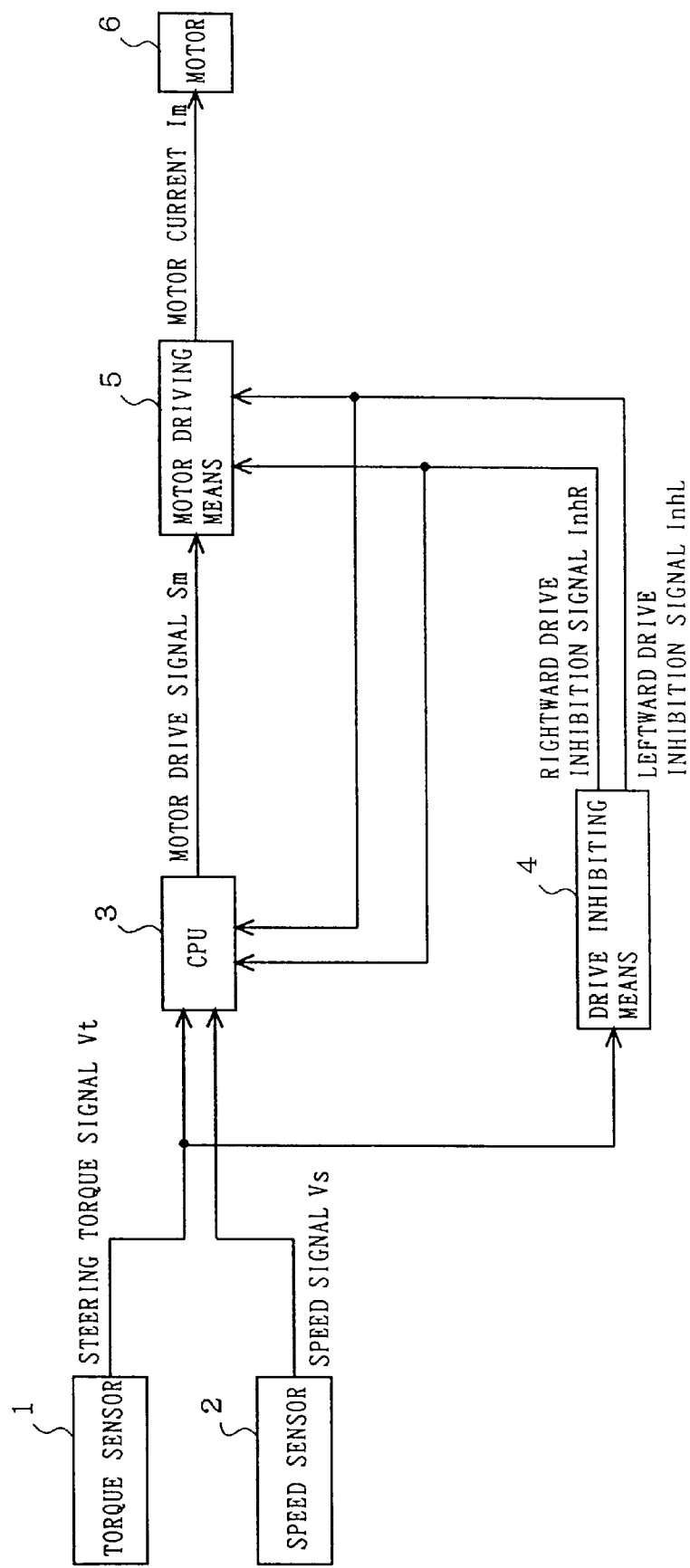
FIG. 18 is a control block diagram showing a conventional electric power steering apparatus.
Figure 20:
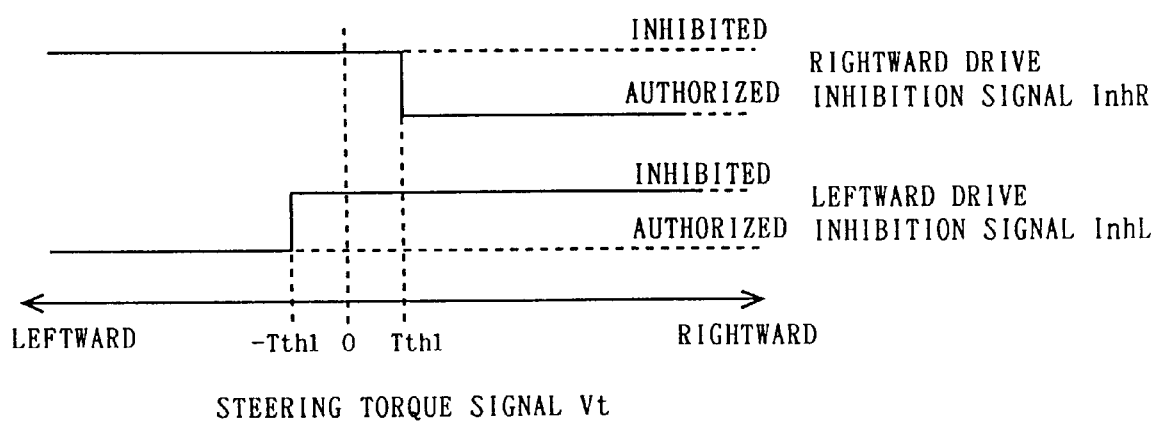
FIG. 20 is a diagram showing the characteristic of the drive inhibiting means in the conventional electric power steering apparatus.

Characteristic of the drive inhibiting means 14 is the same as that shown in FIG. 25. In the case that the motor current Im is larger than the threshold value Ith1, the characteristic of the drive inhibiting means 14 is the same as that in FIG. 20 showing the characteristic of the drive inhibiting means 4 in FIG. 18. However, in the case that the motor current Im is not larger than the threshold value Ith1, it is established that the drive inhibition signals InhR and InhL are authorized only when the steering torque signal Vt is not more than the threshold value Tth2 and not more than the threshold value −Tth2, in other words, when steering is not performed at all otherwise steering is performed with a very small steering force.

FIG. 2 is a diagram showing the state of the characteristic of the drive inhibiting means in the electric power steering apparatus according to Embodiment 1 of the invention.

In FIG. 2, the drive inhibition switch signal Sil shows the characteristic of the drive inhibiting means. Output of the drive inhibition switch signal Sil is H when the motor current Im is larger than the arranged threshold value Ith1, and L when the motor current Im is smaller than the threshold value Ith1.

FIG. 3 is a diagram showing the conditions of outputting the motor current in the electric power steering apparatus according to Embodiment 1 of the invention.

Figure 4:
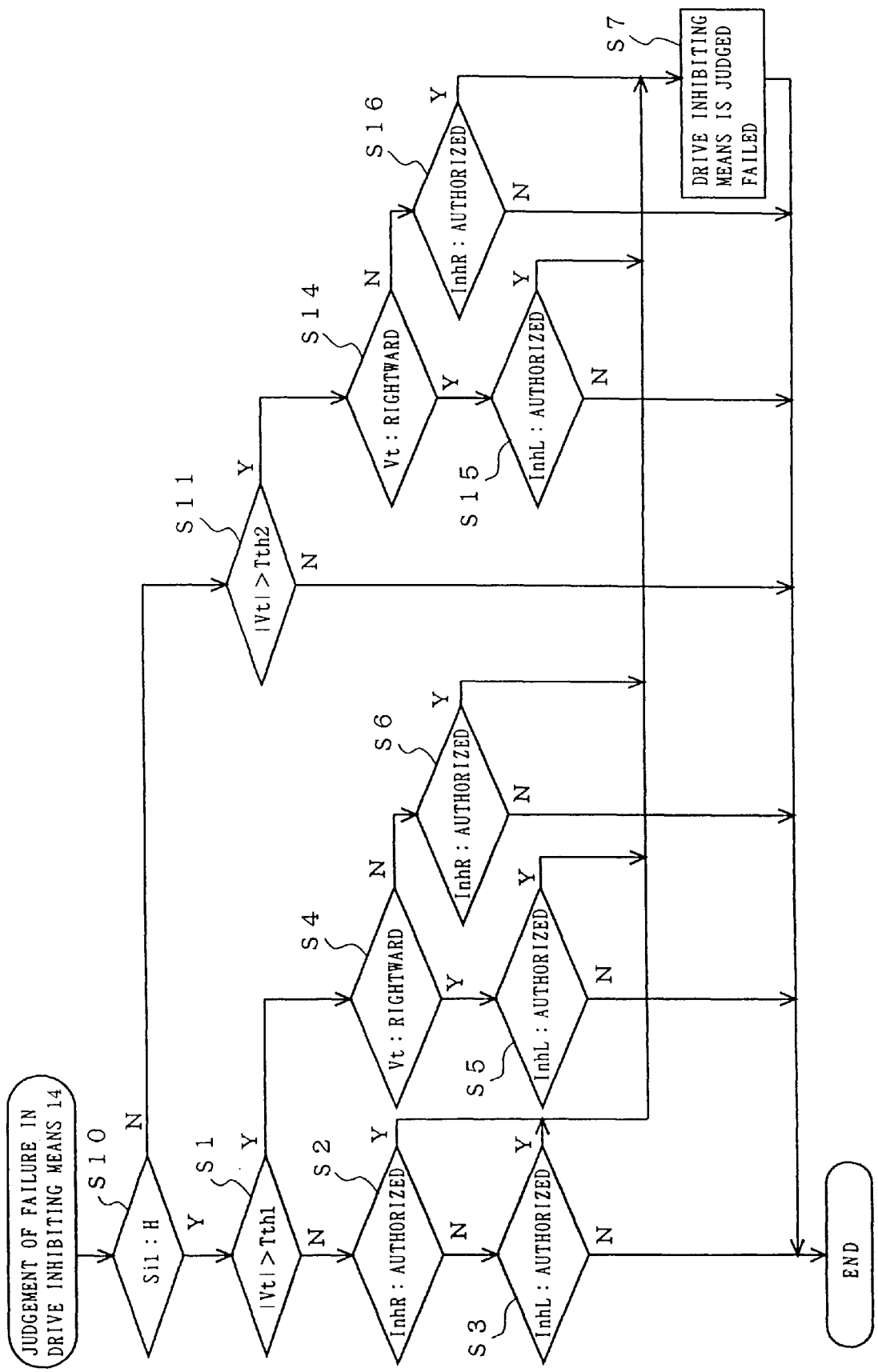
FIG. 4 is a flow diagram showing a process of judging whether or not there is a failure in the drive inhibiting means in the electric power steering apparatus according to Embodiment 1 of the invention.

FIG. 4 is a flow diagram showing a process of judging whether or not there is any failure in the drive inhibiting means in the electric power steering apparatus according to Embodiment 1 of the invention.

Next, described below is the operation of the electric power steering apparatus according to Embodiment 1.

The torque sensor 1 measures a steering torque of the driver and outputs the steering torque signal Vt. The speed sensor 2 measures a speed of the vehicle and outputs the speed signal Vs. The CPU 13 outputs the motor drive signal Sm of a predetermined characteristic corresponding to the steering torque signal Vt and the speed signal Vs. The drive inhibiting means 14 outputs the drive inhibition signals InhR and InhL of predetermined characteristics and the drive inhibition switch signal Sil that shows the state of switching the drive inhibiting means 14 corresponding to the steering torque signal Vt and the motor current Im. The motor driving means 5 outputs the motor current Im for driving the motor 6 corresponding to the motor drive signal Sm and the drive inhibition signals InhR and InhL. As shown in FIG. 3, the motor driving means 5 outputs the motor current Im corresponding to the motor drive signal Sm in the case that the driving direction of the motor drive signal Sm is not inhibited by the drive inhibition signal InhR or InhL. However, in the case that the driving direction is inhibited by the drive inhibition signal InhR or InhL, the motor current Im is set to 0. The motor 6 outputs a steering assist force according to the motor current Im, thereby reducing the steering force of the driver.

In the case that the CPU 13 fails and is in a failure mode wherein the motor drive signal Sm is outputted regardless of the steering torque signal Vt, the output of the motor 6 in the direction opposite to the steering torque signal Vt is inhibited when the driver is steering the vehicle. As a result, it is possible to prevent increase in steering force of the driver caused by the motor 6.

Furthermore, when the driver is not steering the vehicle, the motor current Im is restricted to be not more than the threshold value Ith1. As a result, it is possible to prevent undesirable self-turning of the steering caused by the output of the motor 6. In addition, the threshold value Ith1 is se to a value in which any undesirable self-turning of the steering does not occur.

As shown in FIG. 4, whether or not there is any failure in the drive inhibiting means 14 is judged by comparing the steering torque signal Vt and the states of the drive inhibition signals InhR and InhL. The judging process is switched by the drive inhibition switch signal Sil as described below.

Figure 22:
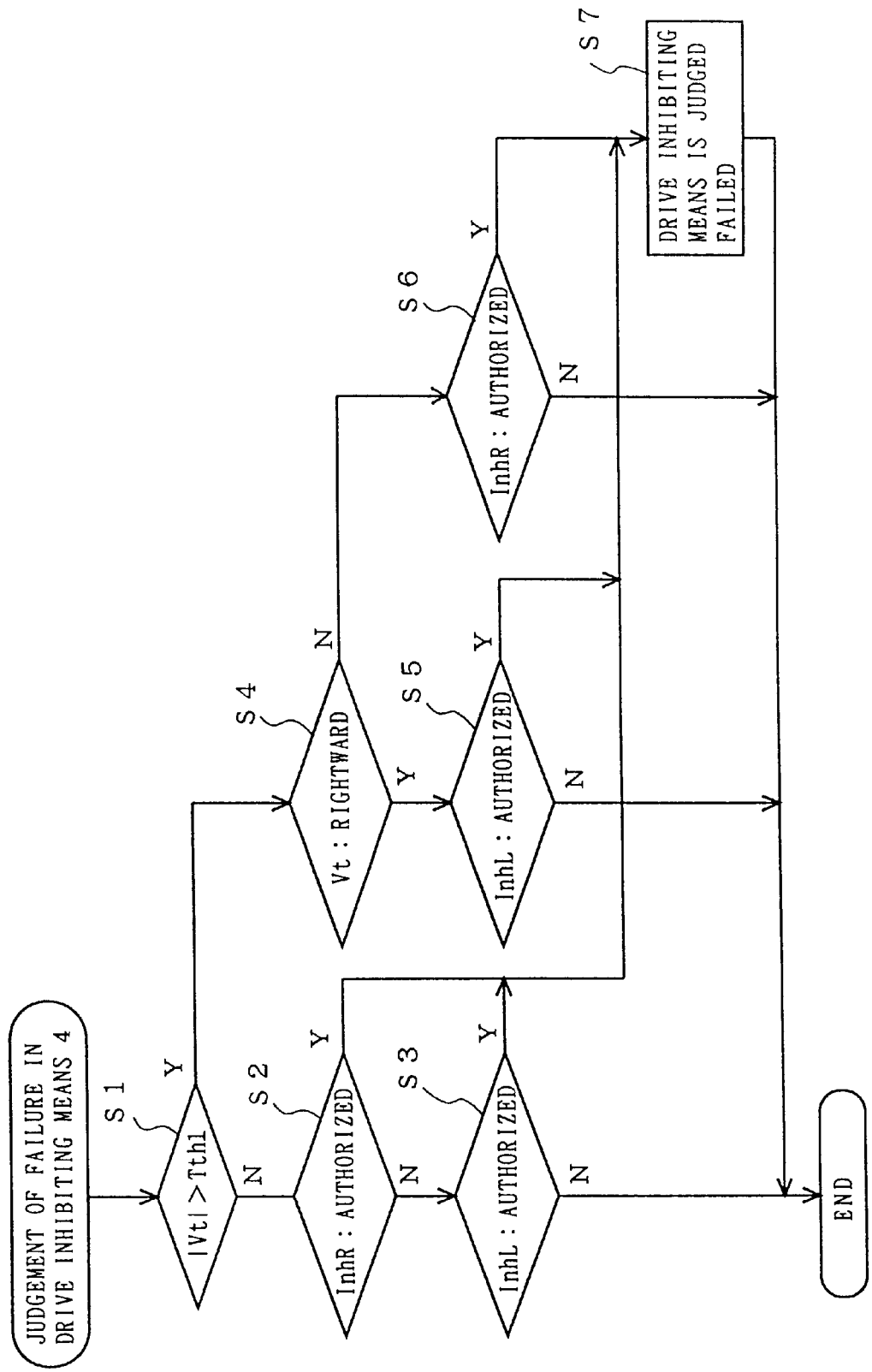
FIG. 22 is a flow diagram showing a process of judging whether or not there is a failure in the drive inhibiting means in the conventional electric power steering apparatus.

Referring to FIG. 4, in the step S10, the drive inhibition switch signal Sil is monitored, and when the drive inhibition switch signal Sil is judged H, i.e., when the motor current Im is large, the process proceeds to the step S1. Then, the process on and after the step S1 is conducted as described in the description of the conventional electric power steering apparatus in FIG. 22 to judge whether or not there is any failure in the drive inhibiting means 14.

When the drive inhibition switch signal Sil is judged L in step S10, i.e., when the motor current Im is small, the process proceeds to step S11. In the step S11, when it is judged that the absolute value of the steering torque signal Vt is not larger than the threshold value Tth2, the process is terminated without conducting any judgment on whether or not there is any failure in the drive inhibiting means 14.

When it is judged that the absolute value of the steering torque signal Vt is larger than the threshold value Tth2, direction of the steering torque signal Vt is judged in step S14. If the direction is judged rightward, the leftward drive inhibition signal InhL is monitored in step S15, and when the signal is authorized, the process proceeds to step S7 to judge that there is a failure in the drive inhibiting means 14. If the direction of the steering torque signal Vt is judged leftward in the step S14, the rightward drive inhibition signal InhR is monitored in step S16. When the signal is authorized, the process proceeds to the step S7 to judge that there is a failure in the drive inhibiting means 14.

Figure 23:
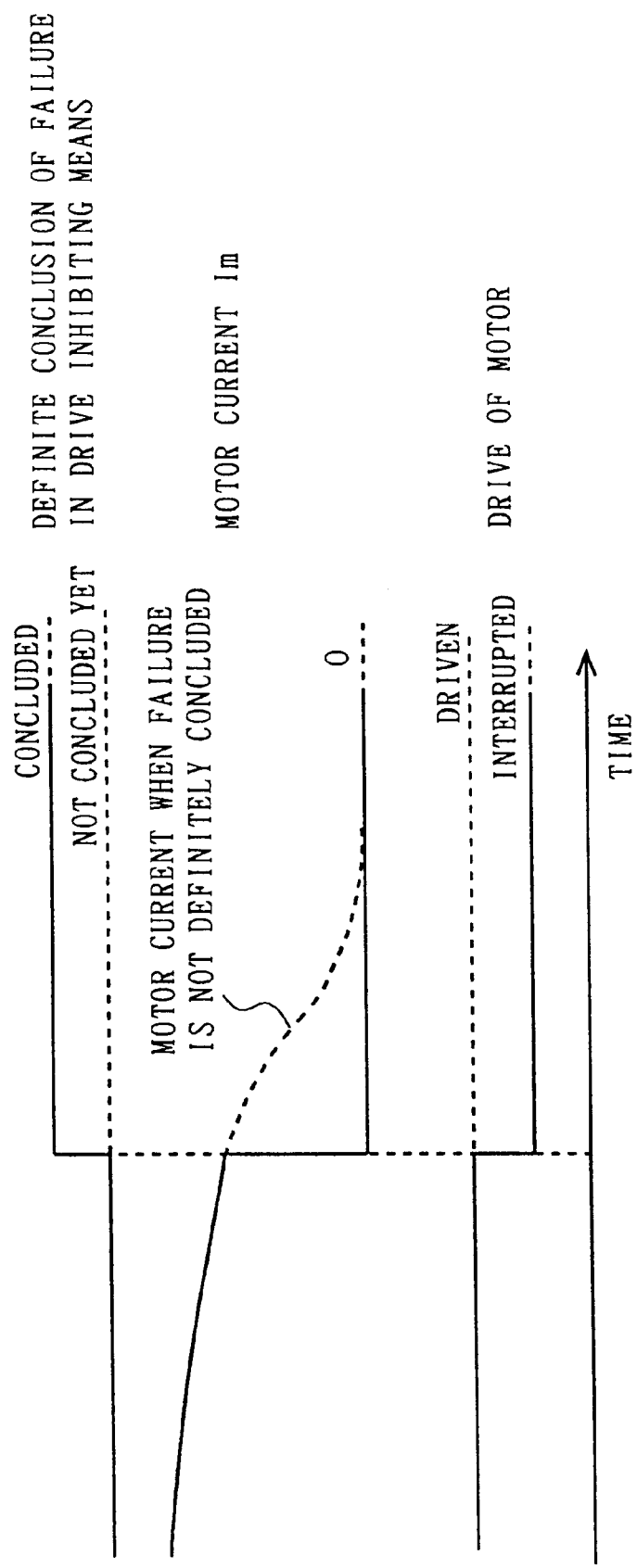
FIG. 23 is a graph showing the operation of the controller when it is judged that there is a failure in the drive inhibiting means in the conventional electric power steering apparatus.

As a result of the foregoing process, if it is judged that there is any failure, occurrence of the failure is definitely concluded, and the motor current Im is set to 0 in order to interrupt the drive of the motor 6 as shown in FIG. 23.

In this Embodiment 1, as described above, it is possible to achieve an electric power steering apparatus which reduces the steering torque of the driver by driving the motor 6 according to the steering force of the driver and generating the steering assist force.

Even if the steering torque signal Vt is in the vicinity of neutral, it is possible to achieve the electric power steering apparatus which generates the steering assist force when the motor current Im is small.

In the case that the CPU 13 fails and outputs the motor drive signal Sm regardless of the steering torque signal Vt, the drive inhibiting means 14 restricts the output of the motor 6. Therefore, it is possible to prevent undesirable self-turning of the steering.

In the case that the CPU 13 judges that the drive inhibiting means 14 fails and can not restrict the output of the motor 6, the drive of the motor 6 is interrupted. Therefore, safety is assured even in a failure mode in which the CPU 13 fails after the failure of the drive inhibiting means 14.

In this setting the motor current Im to 0 interrupts Embodiment 1, the drive of the motor 6. It is also preferable that disposing a relay circuit in the power source system electrically interrupts the drive, otherwise disposing a clutch in the power transmission system mechanically interrupts the drive.

In the foregoing Embodiment 1, the motor current Im is a value without polarity. It is also preferable that the value has a polarity. In this case, for example, the value is compared with the threshold value Ith1 by using the absolute value of the motor current Im.

Embodiment 2

Figure 5:
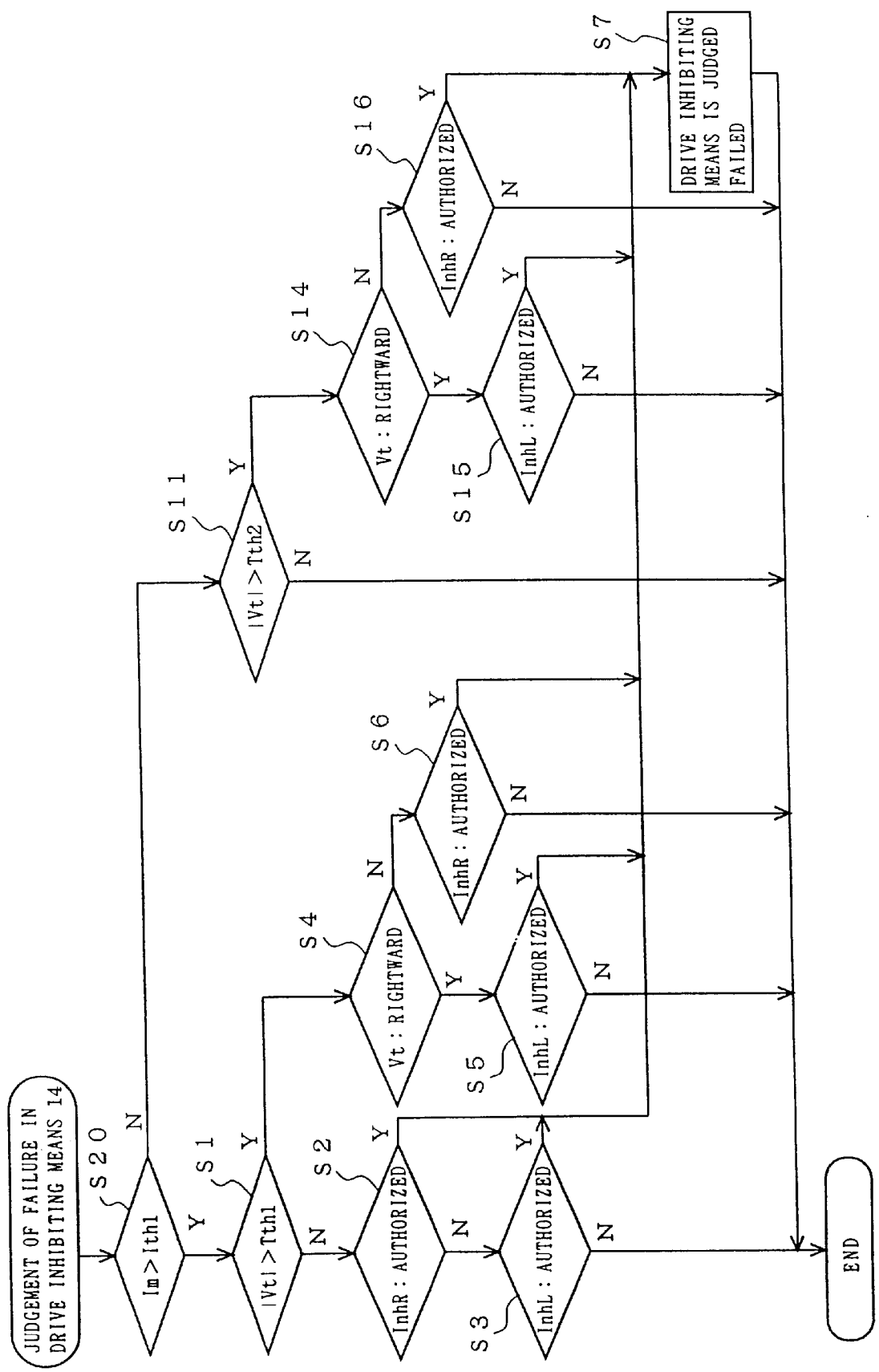
FIG. 5 is a flow diagram showing a process of judging whether or not there is a failure in the drive inhibiting means in the electric power steering apparatus according to Embodiment 2 of the invention.

FIG. 5 is a flow diagram showing a process of judging whether or not there is any failure in the drive inhibiting means in the electric power steering apparatus according to Embodiment 2 of the invention.

In Embodiment 1, the process of detecting failure in the drive inhibiting means 14 is switched by the drive inhibition switch signal Sil. It is also preferable that the motor current Im as shown in FIG. 5 switches the process.

Referring to FIG. 5, in the case that the motor current Im is larger than the threshold value Ith1 in step S20, the process proceeds to the step S1. The process on and after the step S1 is conducted as described in the foregoing Embodiment 1 to judge whether or not there is any failure in the drive inhibiting means 14.

In the case that the motor current Im is not larger than the threshold value Ith1, the process proceeds to the step S11. The process on and after the step S11 is conducted as described in the foregoing Embodiment 1 to judge whether or not there is any failure in the drive inhibiting means 14.

In this Embodiment 2, in the same manner as in the foregoing Embodiment 1, it is possible to achieve an electric power steering apparatus in which whether or not there is any failure in the drive inhibiting means 14 is judged.

Figure 24:
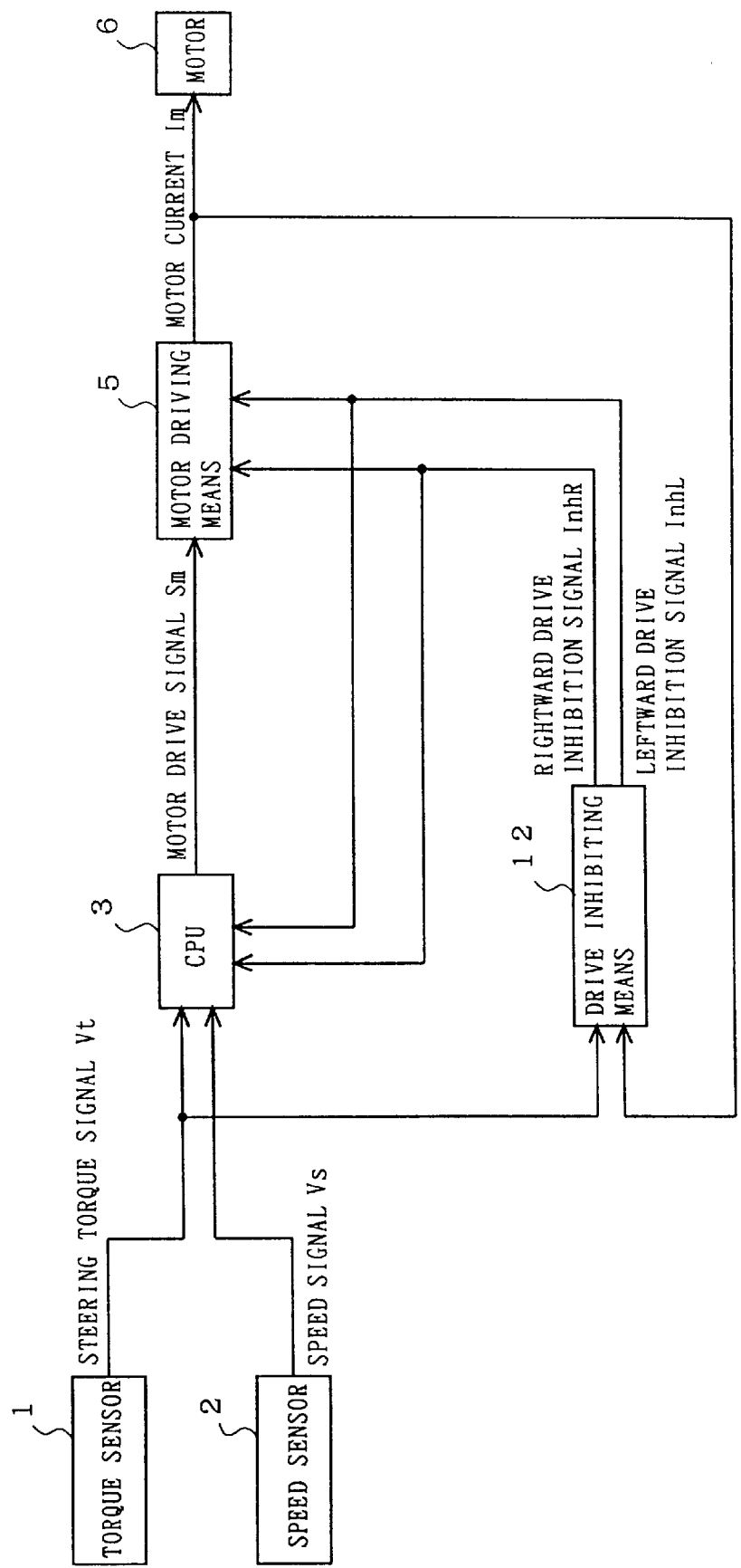
FIG. 24 is a control block diagram showing a conventional electric power steering apparatus in which the characteristic of the drive inhibiting means is changed by the motor current.

Whether or not there is any failure in the drive inhibiting means 14 is judged without using the drive inhibition switch signal Sil. Therefore, it is possible to arrange that the drive inhibiting means 14 does not output the drive inhibition signal Sil to the CPU 13 as shown in the block diagram of FIG. 24. As a result, it is possible to achieve the electric power steering apparatus with a simpler circuitry.

Embodiment 3

Figure 6:
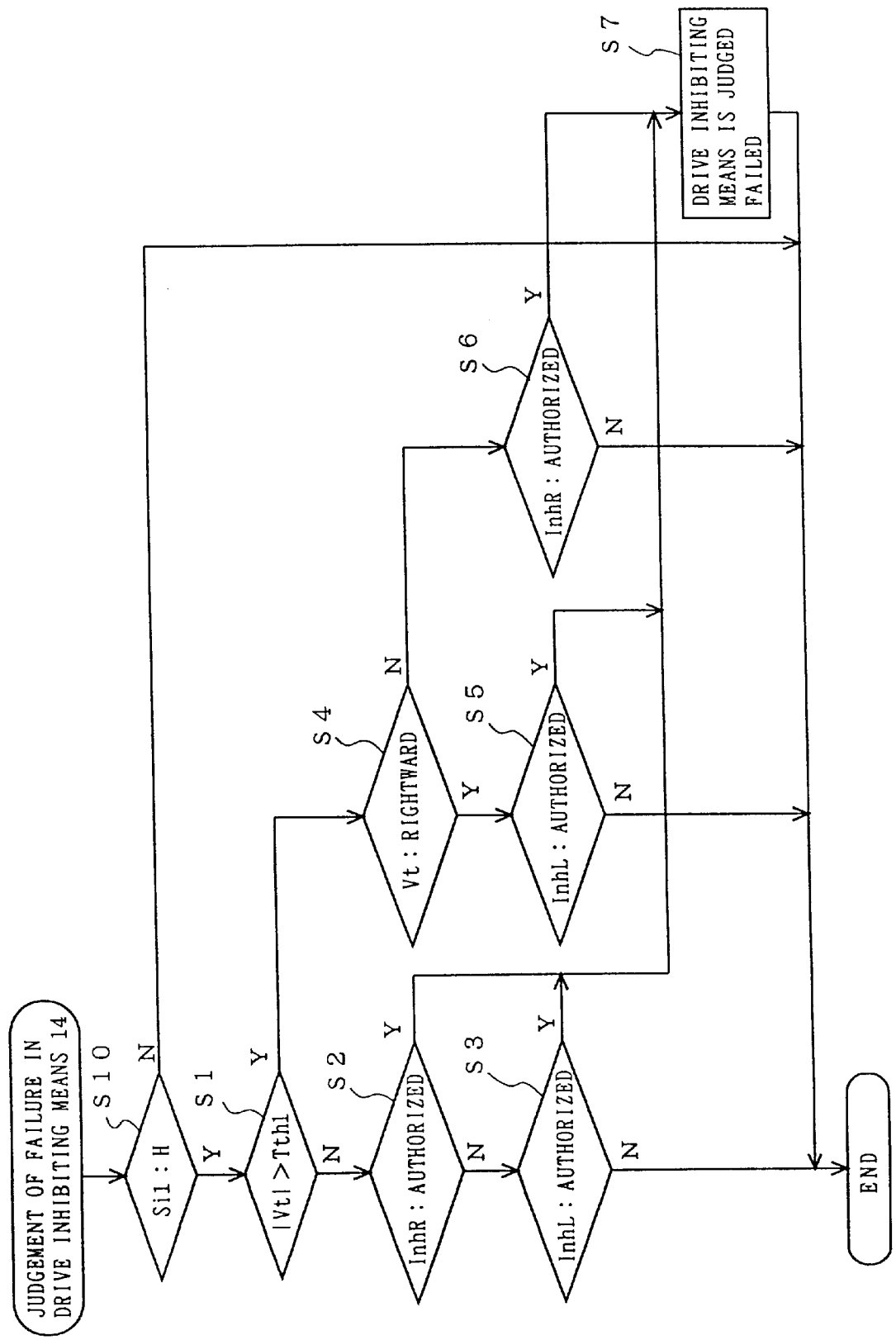
FIG. 6 is a flow diagram showing a process of judging whether or not there is a failure in the drive inhibiting means in the electric power steering apparatus according to Embodiment 3 of the invention.

FIG. 6 is a flow diagram showing a process of judging whether or not there is any failure in the drive inhibiting means in the electric power steering apparatus according to Embodiment 3 of the invention.

In the foregoing Embodiment 1, whether or not there is any failure in the drive inhibiting means 14 is judged when the drive inhibition switch signal Sil is L. It is not always necessary to conduct the judgment is in such a manner as shown in FIG. 6.

Referring to FIG. 6, when the drive inhibition switch signal Sil is judged H in the step S10, the process proceeds to the step S1. The process on and after the step S1 is conducted as described in the foregoing Embodiment 1 to judge whether or not there is any failure in the drive inhibiting means 14. When the drive inhibition switch signal Sil is judged L in the step S10, the process is terminated without judgment on whether or not there is any failure.

In this Embodiment 3, it is possible to simplify the process of detecting a failure in the drive inhibiting means 14, and it is therefore possible to achieve an electric power steering apparatus of a simpler construction.

Embodiment 4

Figure 7:
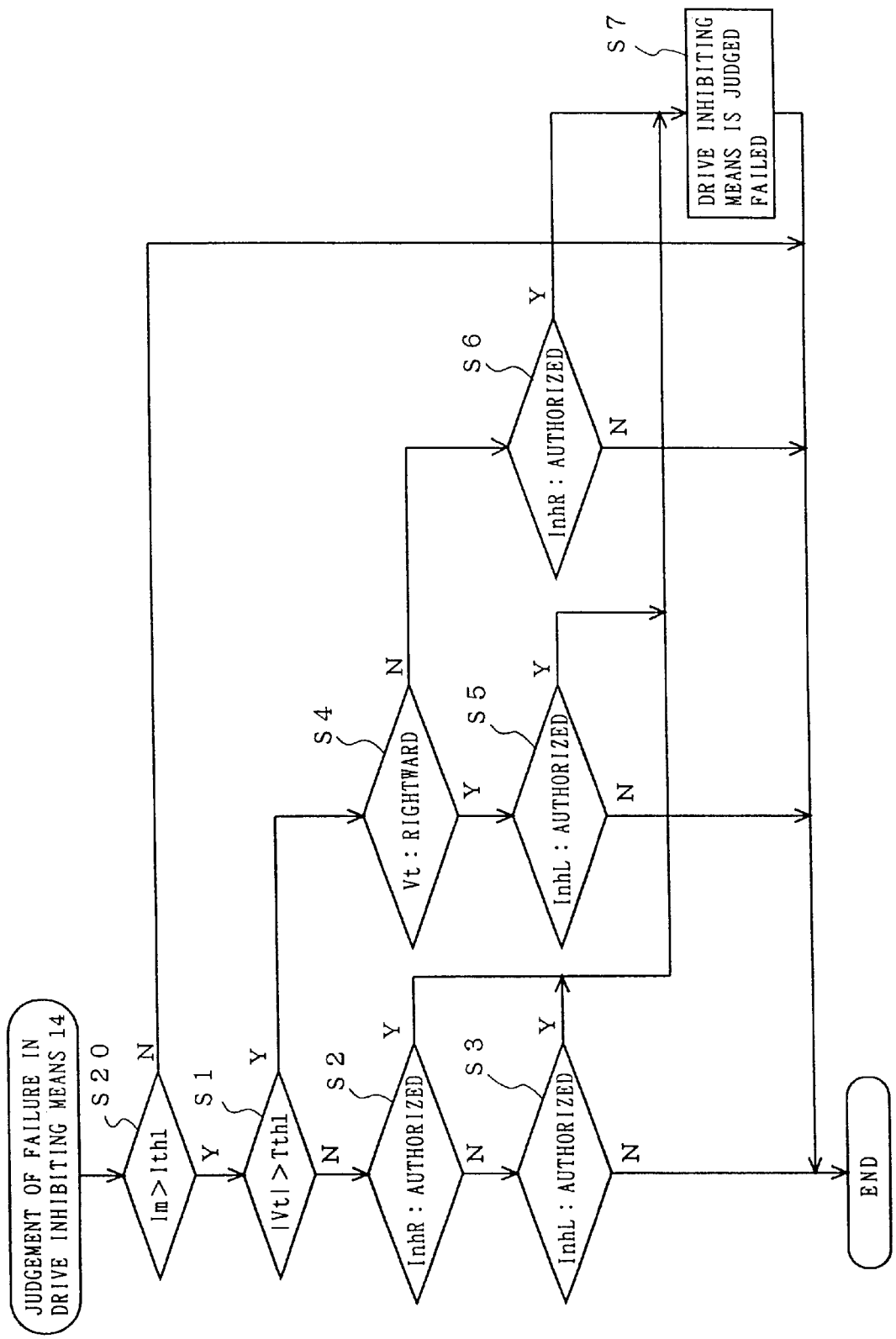
FIG. 7 is a flow diagram showing a process of judging whether or not there is a failure in the drive inhibiting means in the electric power steering apparatus according to Embodiment 4 of the invention.

FIG. 7 is a flow diagram showing a process of judging whether or not there is any failure in the drive inhibiting means in the electric power steering apparatus according to Embodiment 4 of the invention.

In the foregoing Embodiment 2, whether or not there is any failure in the drive inhibiting means 14 is judged when the motor current Im is not larger than the threshold value Ith1. It is not always necessary to conduct the judgment is in such a manner as shown in FIG. 7.

Referring to FIG. 7, when it is judged that the motor current Im is larger than the threshold value Ith1 in the step S20, the process proceeds to the step S1. The process on and after the step S1 is conducted as described in Embodiment 1 to judge whether or not there is any failure in the drive inhibiting means 14. When it is judged that the motor current Im is not larger than the threshold value Ith1 in the step S20, the process is terminated without judgment on whether or not there is any failure.

In this Embodiment 4, it is possible to simplify the process of detecting a failure in the drive inhibiting means 14, and it is therefore possible to achieve an electric power steering apparatus of a simpler construction.

Embodiment 5

FIG. 8 is a diagram showing a range within which no judgment is made on whether or not there is any failure in the drive inhibiting means in the electric power steering apparatus according to Embodiment 5 of the invention.

Figure 9:
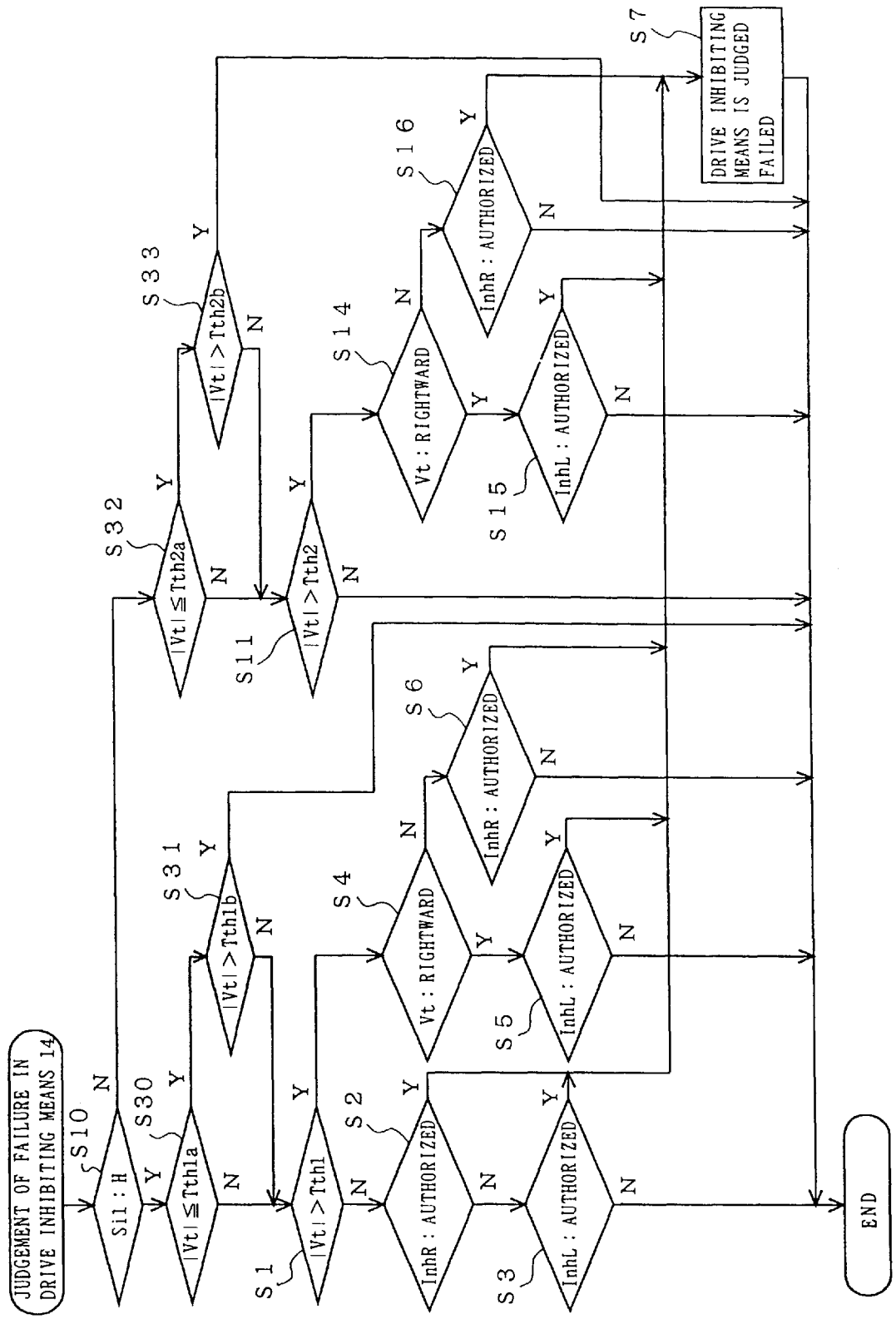
FIG. 9 is a flow diagram showing a process of judging whether or not there is a failure in the drive inhibiting means in the electric power steering apparatus according to Embodiment 5 of the invention.

FIG. 9 is a flow diagram showing a process of judging whether or not there is any failure in the drive inhibiting means in the electric power steering apparatus according to Embodiment 5 of the invention.

In any of the foregoing Embodiment 1, Embodiment 2, Embodiment 3, and Embodiment 4, whether or not there is any failure in the drive inhibiting means 14 is judged regardless of the steering torque signal Vt. It is also preferable to arrange that no judgment is made when the steering torque signal Vt is within a predetermined range.

FIG. 8 shows that a threshold value Tth1a and a threshold value Tth1b are established putting the threshold value Tth1 between them. Whether or not there is any failure in the drive inhibiting means is not judged when the motor current Im>Ith1 and the absolute value of the steering torque signal Vt is between the threshold value Tth1a and the threshold value Tth1b. FIG. 8 also shows that a threshold value Tth2a and a threshold value Tth2b are established putting the threshold value Tth2 between them. Whether or not there is any failure in the drive inhibiting means is not judged when the motor current Im≦Ith1 and the absolute value of the steering torque signal Vt is between the threshold value Tth2a and the threshold value Tth2b.

Next, described below is the process of judging whether or not there is any failure in the drive inhibiting means with reference to FIG. 9.

Referring to FIG. 9, the drive inhibition switch signal Sil is monitored in the step S10, and if the drive inhibition switch signal Sil is judged H, the process proceeds to step S30. In the steps S30 and S31, whether or not a condition, that the absolute value of the steering torque signal Vt is larger than the threshold value Tth1b and not larger than the threshold value Tth1a, is satisfied, is judged. If it is judged that the condition is satisfied, judgment on whether or not there is any failure in the drive inhibiting means 14 is terminated. If it is judged that the condition is not satisfied, the process proceeds to the step S1, and the process on and after the step S1 is conducted as described in the foregoing Embodiment 1 to judge whether or not there is any failure in the drive inhibiting means 14.

If the drive inhibition switch signal Sil is judged L in the step S10, the process proceeds to step S32. In the steps S32 and S33, whether or not a condition, that the absolute value of the steering torque signal Vt is larger than the threshold value Tth2b and not larger than the threshold value Tth2a, is satisfied, is judged. If it is judged that the condition is satisfied, judgment on whether or not there is any failure in the drive inhibiting means 14 is terminated. If it is judged that the condition is not satisfied, the process proceeds to the step S11, and the process on and after the step S11 is conducted as described in the foregoing Embodiment 1 to judge whether there is failure in the drive inhibiting means 14.

In this respect, on the supposition that a difference between the steering torque signals Vt inputted into the CPU 13 and the drive inhibiting means 14 due to irregularities in circuit element or the like as dVt, the threshold value Tth1a and threshold value Tth1b and the threshold value Tth2a and threshold value Tth2b are established to satisfy the following equations:

$$Tth1a-Tth1>dVt$$

$$Tth1-Tth1b>dVt$$

$$Tth2a-Tth2>dVt$$

$$Tth2-Tth2b>dVt$$

As a result of such establishment, it is possible to prevent erroneous failure detection in the drive inhibiting means 14 due to the irregularities in the circuit element or the like.

In this Embodiment 5, whether or not there is any failure in the drive inhibiting means 14 is not judged when the steering torque signal Vt is within the predetermined range. As a result, it is possible to achieve a highly reliable electric power steering apparatus in which erroneous failure detection is reduced.

Embodiment 6

Figure 10:
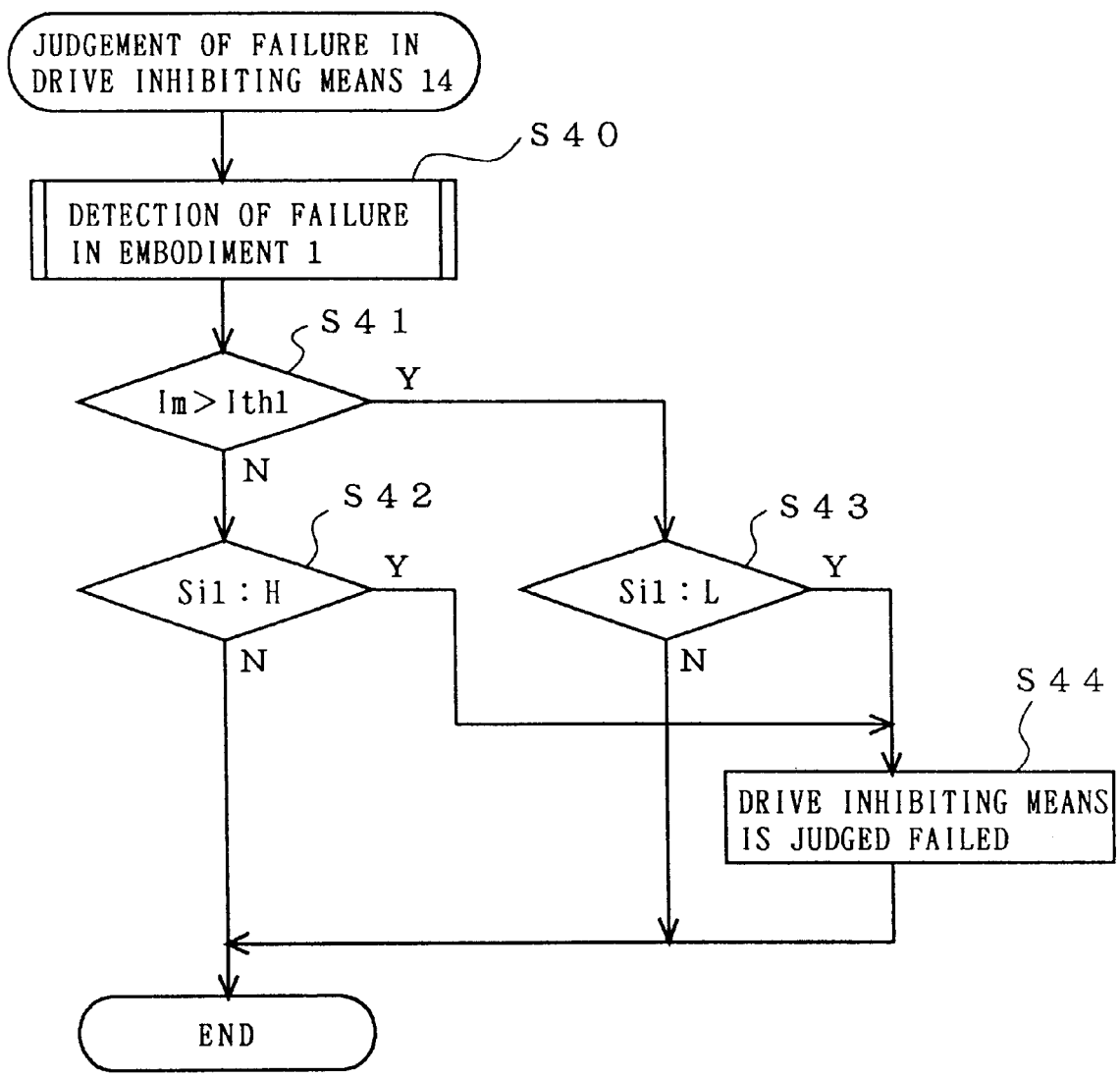
FIG. 10 is a flow diagram showing a process of judging whether or not there is a failure in the drive inhibiting means in the electric power steering apparatus according to Embodiment 6 of the invention.

FIG. 10 is a flow diagram showing a process of judging whether or not there is any failure in the drive inhibiting means in the electric power steering apparatus according to Embodiment 6 of the invention.

In any of the foregoing Embodiment 1, Embodiment 2, Embodiment 3, Embodiment 4, and Embodiment 5, whether or not there is any failure in the drive inhibiting means 14 is judged by using the drive inhibition signals InhR and InhL. It is also preferable to add a process of using the drive inhibition switch signal Sil as shown in FIG. 10.

Referring to FIG. 10, step S40 is the same process of detecting a failure as that in the foregoing Embodiment 1. In step S41, the motor current Im and the threshold value Ith1 are compared, and if it is judged that the motor current Im is not larger than the threshold value Ith1, the process proceeds to step S42. In the step S42, the drive inhibition switch signal Sil is monitored, and if the drive inhibition switch signal Sil is H, the process proceeds to step S44 and it is judged that there is a failure in the drive inhibiting means 14. If it is judged that the motor current Im is larger than the threshold value Ith1 in the step S41, the process proceeds to step S43. In the step S43, the drive inhibition switch signal Sil is monitored, and if the drive inhibition switch signal Sil is L, the process proceeds to the step S44 and it is judged that there is a failure in the drive inhibiting means 14.

In this Embodiment 6, it is possible to judge whether or not there is any failure in the drive inhibiting means 14 even when the drive inhibition switch signal Sil is abnormal. As a result, a more highly reliable electric power steering apparatus is achieved.

Embodiment 7

Figure 11:
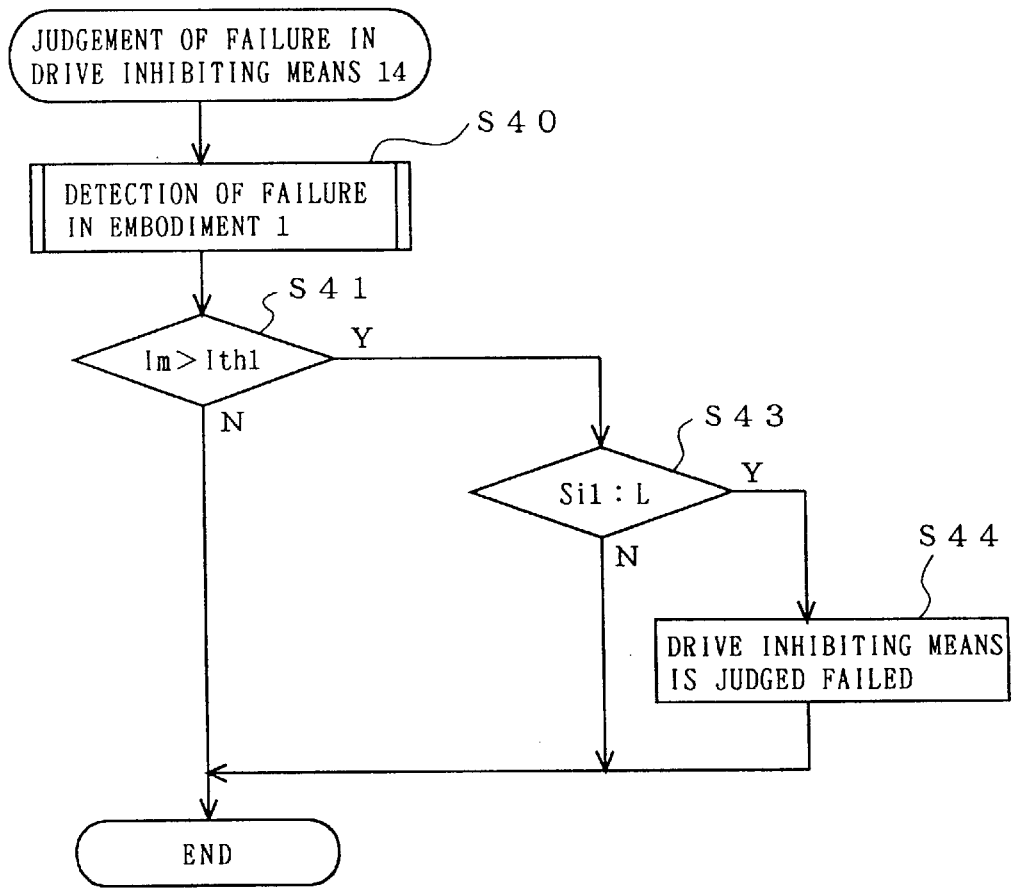
FIG. 11 is a flow diagram showing a process of judging whether or not there is a failure in the drive inhibiting means in the electric power steering apparatus according to Embodiment 7 of the invention.

FIG. 11 is a flow diagram showing a process of judging whether or not there is any failure in the drive inhibiting means in the electric power steering apparatus according to Embodiment 7 of the invention.

In the foregoing Embodiment 6, whether or not there is any failure in the drive inhibiting means 14 is judged when the motor current Im is smaller than the threshold value Ith1. It is also preferable that no judgment is made as shown in FIG. 11.

Referring to FIG. 11, when it is judged that the motor current Im is not larger than the threshold value Ith1 in the step S41, the process is terminated without judgment on whether or not there is any failure. If it is judged that the motor current Im is larger than the threshold value Ith1 in the step S41, the process proceeds to the step S43. The process on and after the step S43 is conducted as described in the foregoing Embodiment 6 to judge whether or not there is any failure in the drive inhibiting means 14.

The process proceeds to the process of judging that there is a failure in the drive inhibiting means in the step S44 only when the drive inhibition switch signal Sil is L. In other words, whether or not there is any failure is not judged when the drive inhibition switch signal Sil is H.

In this Embodiment 7, it is possible to simplify the process of detecting a failure in the drive inhibiting means 14. As a result, an electric power steering apparatus of a simpler construction is achieved.

Embodiment 8

Figure 12:
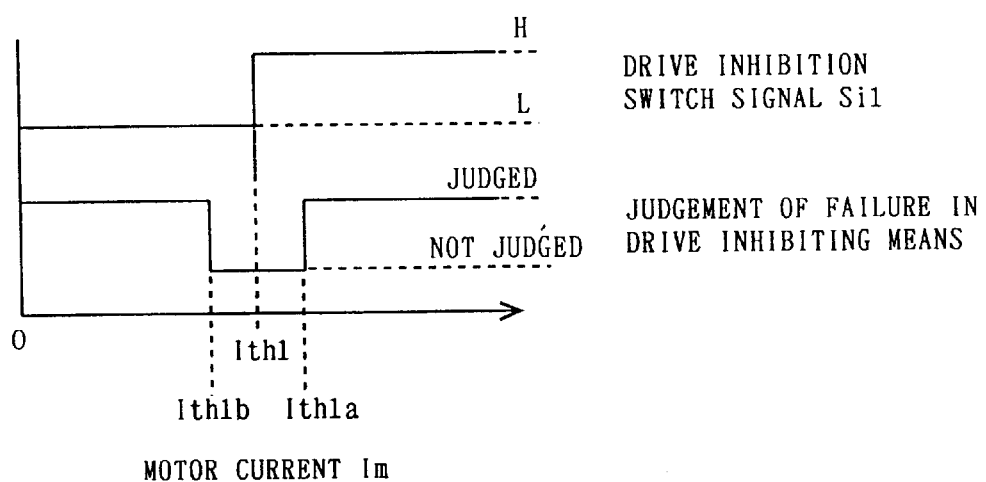
FIG. 12 is a diagram showing a range within which no judgment is made on whether or not there is a failure in the electric power steering apparatus according to Embodiment 8 of the invention.

FIG. 12 is a diagram showing a range within which no judgment is made on whether or not there is any failure in the electric power steering apparatus according to Embodiment 8 of the invention.

Figure 13:
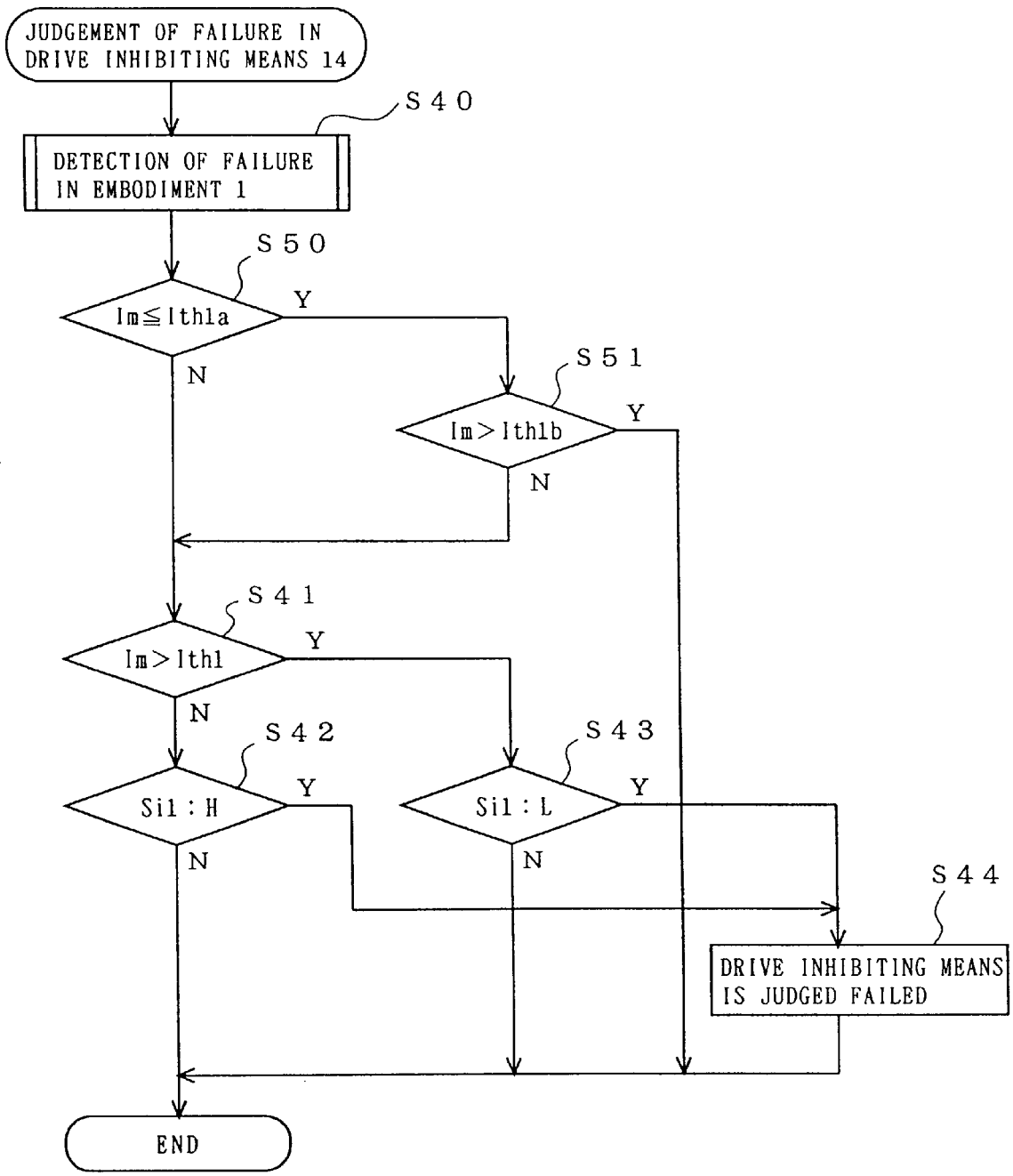
FIG. 13 is a flow diagram showing a process of judging whether or not there is a failure in the drive inhibiting means in the electric power steering apparatus according to Embodiment 8 of the invention.

FIG. 13 is a flow diagram showing a process of judging whether or not there is any failure in the drive inhibiting means in the electric power steering apparatus according to Embodiment 8 of the invention.

In the foregoing Embodiment 6 and Embodiment 7, whether or not there is any failure in the drive inhibiting means 14 is judged regardless of the motor current Im. It is also preferable to establish that no judgment is made when the motor current Im is within a predetermined range. FIG. 12 shows that a threshold value Ith1a and a threshold value Ith1b are established putting the threshold value Ith1 between them and whether or not there is any failure in the drive inhibiting means is not judged when the motor current Im is between the threshold value Ith1a and the threshold value Ith1b.

Described below is the flow of judging whether or not there is any failure in the drive inhibiting means with reference to FIG. 13.

In FIG. 13, the step S40 is the same process of detecting a failure as that in the foregoing Embodiment 1. In steps S50 and S51, whether or not a condition, that the motor current Im is larger than the threshold value Ith1b and not larger than the threshold value Ith1a, is satisfied, is judged. If it is judged that the condition is satisfied, the judgment on whether or not there is any failure in the drive inhibiting means 14 is terminated. If it is judged that the condition is not satisfied, the process proceeds to the step S41. The process on ad after the step S41 is conducted as described in the foregoing Embodiment 6 to judge whether or not there is any failure in the drive inhibiting means 14.

In this respect, on the supposition that a difference between between the motor currents Im inputted into the CPU 13 and the drive inhibiting means 14 due to irregularities in circuit element or the like as dVt, the threshold value Tth1a and threshold value Tth1b are established to satisfy the following equations:

$$Ith1a - Ith1 > dIm$$

$$Ith1 - Ith1b > dIm,$$

As a result of such establishment, it is possible to prevent erroneous failure detection in the drive inhibiting means 14 due to the irregularities in the circuit element or the like.

In this Embodiment 8, whether or not there is any failure in the drive inhibiting means 14 is not judged when the motor current Im is within the predetermined range. As a result, it is possible to achieve a highly reliable electric power steering apparatus in which erroneous failure detection is reduced.

Embodiment 9

Figure 14:
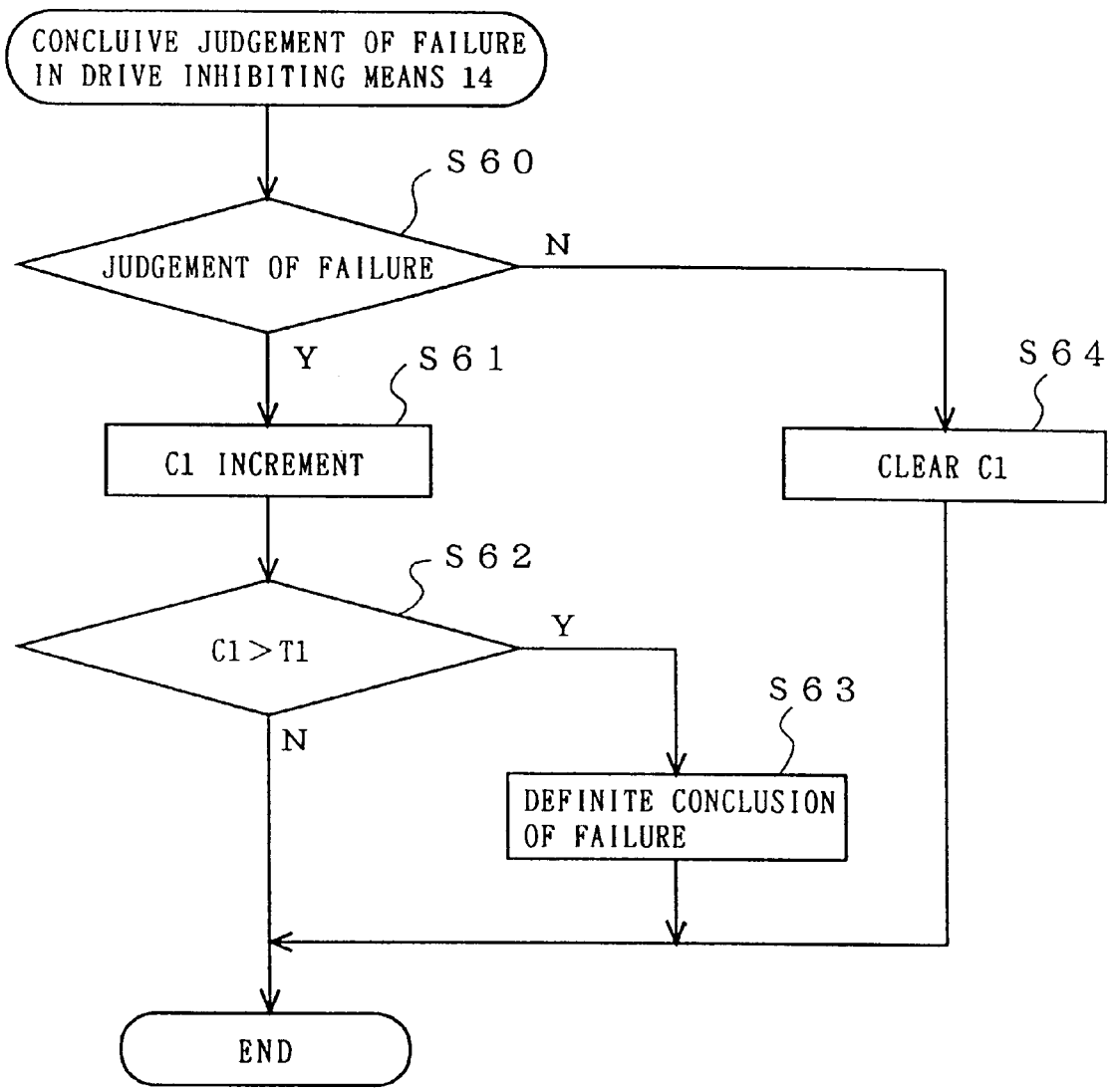
FIG. 14 is a flow diagram showing a process of judging whether or not there is a failure in the drive inhibiting means in the electric power steering apparatus according to Embodiment 9 of the invention.

FIG. 14 is a flow diagram showing a process of judging whether or not there is any failure in the drive inhibiting means in the electric power steering apparatus according to Embodiment 9 of the invention.

In any of the foregoing Embodiment 1, Embodiment 2, Embodiment 3, Embodiment 4, Embodiment 5, Embodiment 6, Embodiment 7, and Embodiment 8, when it is judged that there is a failure in the drive inhibiting means 14, occurrence of the failure is immediately concluded. It is also preferable to establish that occurrence of failure is not definitely concluded unless the state of judging that there is any failure continues for a certain conclusion time T1.

Referring to FIG. 14, judgment on whether or not there is any failure in the drive inhibiting means 14 is monitored in step S60, and if it is judged that any failure has been detected, the process proceeds to step S61. Increment of a counter C1 is conducted in the step S61, and the counter C1 and the conclusion time T1 are compared with each other in step S62. If the counter C1 is larger than the conclusion time T1, the process proceeds to step S63 and it is definitely concluded that there is a failure in the drive inhibiting means 14. If it is judged that no failure has been detected in the step S60 the process proceeds to step S64 to clear the counter C1.

In the foregoing description, the conclusion time is a time passing continuously after the point when the counter C1 is cleared in the step S64. It is also preferable that the conclusion time is an integrated time omitting the process of clearing the counter C1.

In this Embodiment 9, a margin is produced from the time when it is judged that there is a failure until the time when the drive of the motor 6 is interrupted. Therefore, it is possible to prevent erroneously concluding occurrence of a failure in the case that it has erroneously judged that there is a failure due to interference of noises by establishing the value of the conclusion time T1 to be sufficiently long. As a result, it is possible to achieve a noise-proof and highly reliable electric power steering apparatus.

Embodiment 10

Figure 15:
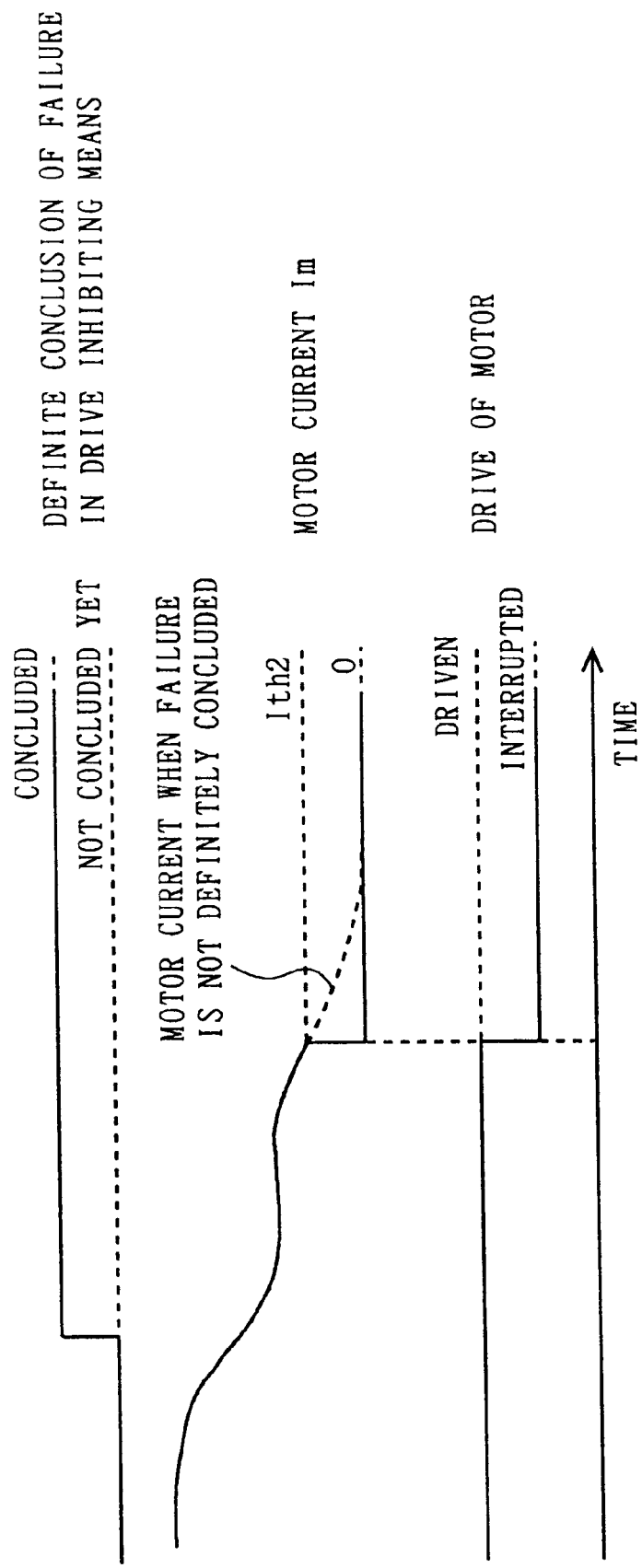
FIG. 15 is a diagram showing the operation of the controller when it is judged that there is failure in the drive inhibiting means in the electric power steering apparatus according to Embodiment 10 of the invention.

FIG. 15 is a diagram showing operation of the controller when it is judged that there is a failure in the drive inhibiting means in the electric power steering apparatus according to Embodiment 10 of the invention.

In any of the foregoing Embodiment 1, Embodiment 2, Embodiment 3, Embodiment 4, Embodiment 5, Embodiment 6, Embodiment 7, Embodiment 8, and Embodiment 9, when occurrence of failure in the drive inhibiting means 14 is definitely concluded, the drive of the motor 6 is interrupted by setting the motor current Im to 0 regardless of the motor current Im. It is also preferable that after occurrence of failure in the drive inhibiting means 14 is definitely concluded, the motor current Im is set to 0 in order to interrupt the drive of the motor 6 when the motor current Im becomes smaller than the established threshold value Ith2.

In this manner, the drive of the motor 6 is interrupted only when the motor current Im is smaller than the threshold value Ith2, and therefore it is possible to prevent a sharp reduction in output of the motor 6 due to the interruption of the drive of the motor 6 by establishing the threshold value Ith2 to be a sufficiently small current value.

As a result, in this Embodiment 10, it is possible to prevent a sharp reduction in steering force of the driver and achieve a safe electric power steering apparatus.

Embodiment 11

Figure 16:
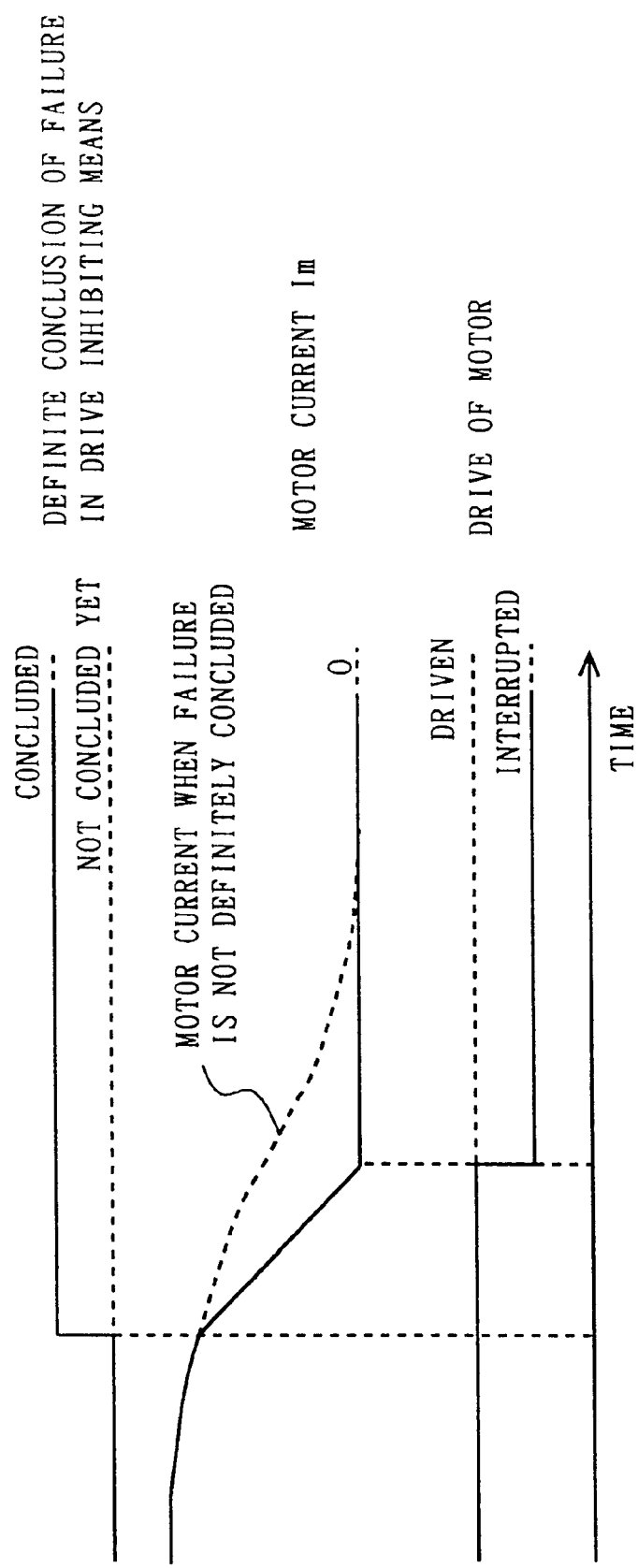
FIG. 16 is a diagram showing the operation of the controller when it is judged that there is failure in the drive inhibiting means in the electric power steering apparatus according to Embodiment 11 of the invention.

FIG. 16 is a diagram showing operation of the controller when it is judged that there is a failure in the drive inhibiting means in the electric power steering apparatus according to Embodiment 11 of the invention.

In any of the foregoing Embodiment 1, Embodiment 2, Embodiment 3, Embodiment 4, Embodiment 5, Embodiment 6, Embodiment 7, Embodiment 8, Embodiment 9, and Embodiment 10, when occurrence of failure in the drive inhibiting means 14 is definitely concluded, the drive of the motor 6 is interrupted by instantaneously setting the motor current Im to 0. It is also preferable that the drive of the motor 6 is interrupted by gradually reducing the motor current Im to 0 as shown in FIG. 16.

In this manner, the output of the motor 6 is gradually reduced from the time when it is judged that there is a failure until the time when the drive of the motor 6 is interrupted.

As a result, in this Embodiment 11, the steering force of the driver is gradually increased, and it is possible to achieve a safe electric power steering apparatus.

Embodiment 12

In any of the foregoing Embodiment 1, Embodiment 2, Embodiment 3, Embodiment 4, Embodiment 5, Embodiment 6, Embodiment 7, Embodiment 8, Embodiment 9, Embodiment 10, and Embodiment 11, the state in which occurrence of failure in the drive inhibiting means 14 is definitely concluded is cancelled by interrupting the power source of the electric power steering apparatus. It is also preferable that the state is stored and held.

Figure 17:
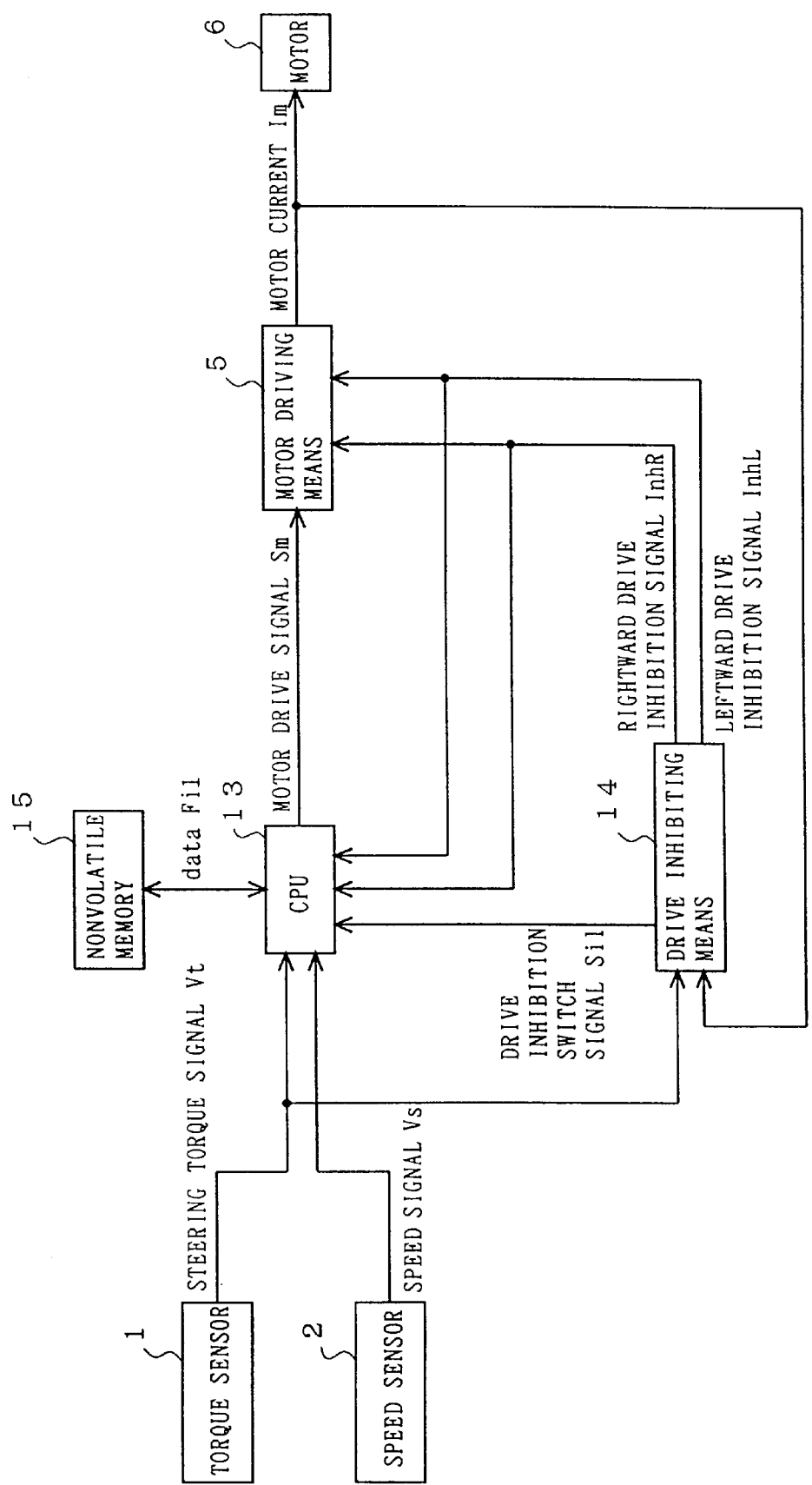
FIG. 17 is a control block diagram showing the electric power steering apparatus according to Embodiment 12 of the invention.

FIG. 17 is a control block diagram showing the electric power steering apparatus according to Embodiment 12 of the invention.

In FIG. 17, numerals 1, 2, 5, 6, 13, and 14 are the same as those in FIG. 1. Numeral 15 is a nonvolatile memory using EEPROM or the like, and the nonvolatile memory holds the stored information even when the power source of the electric power steering apparatus is interrupted.

Described below is operation.

When the CPU 13 judges that there is a failure in the drive inhibiting means 14, data Fil showing that there is a failure in the drive inhibiting means 14 is written in the nonvolatile memory 15. The data Fil are held even after the power source of the electric power steering apparatus is interrupted. Therefore, by acknowledging whether or not the data Fil are written in the nonvolatile memory 15 at the time of starting the electric power steering apparatus, it becomes possible to judge whether the failure in the drive inhibiting means 14 has been definitely concluded before the interruption of the power source of the electric power steering apparatus. When it is judged that there is a failure in the drive inhibiting means 14, the judgment that there is a failure in the drive inhibiting means 14 is definitely concluded.

In this Embodiment 12, once it is judged that there is a failure in the drive inhibiting means 14 and the drive of the motor 6 is interrupted, thereafter the drive of the motor 6 is kept being interrupted by continuously holding the state. As a result, it is possible to achieve a more reliable electric power steering apparatus.

What is claimed is:

1. An electric power steering apparatus, comprising:

a motor generating an auxiliary steering force on the basis of a steering torque;

a control means (CPU) for outputting a motor drive signal of a predetermined characteristic corresponding to said steering torque signal and a speed signal of a vehicle;

motor driving means for outputting a motor current applied to said motor corresponding to said motor drive signal;

drive inhibiting means for outputting to said motor a drive inhibition signal to restrict drive of said motor, said drive inhibition signal being determined according to a relation between said steering torque and a motor current; and wherein said control means (CPU) detects a failure in said drive inhibiting means according to the relation between said steering torque and the motor current using said drive inhibition signal outputted by said drive inhibiting means.

2. The electric power steering apparatus according to claim 1, wherein said drive inhibiting means outputs a drive inhibition switch signal corresponding to the relation between the steering torque and the motor current to the failure detecting means, and the failure detecting means detects a failure corresponding to said drive inhibition switch signal.

3. The electric power steering apparatus according to claim 2, wherein the failure detecting means does not detect a failure when the drive inhibition switch signal and the drive inhibition signal satisfy predetermined conditions.

4. The electric power steering apparatus according to claim 2, wherein the failure detecting means does not detect a failure when the drive inhibition switch signal outputted by the drive inhibiting means is within a predetermined range.

5. The electric power steering apparatus according to claim 2, wherein the failure detecting means detects abnormality of the drive inhibition switch signal in association with the motor current.

6. The electric power steering apparatus according to claim 5, wherein the failure detecting means does not detect abnormality of the drive inhibition switch signal when the motor current is smaller than a predetermined value.

7. The electric power steering apparatus according to claim 5, wherein the failure detecting means does not detect a failure when said motor current is within a predetermined range near a switching point where the drive inhibition switch signal is inverted.

8. The electric power steering apparatus according to claim 1, wherein the relation between said steering torque and the motor current is switched corresponding to the motor current, and the failure detecting means detects a failure corresponding to the motor current reflecting the state of switching the relation between the steering torque and the motor current.

9. The electric power steering apparatus according to claim 8, wherein the failure detecting means does not detect a failure when the motor current and the drive inhibition signal satisfy predetermined conditions.

10. The electric power steering apparatus according to claim 8, wherein the failure detecting means does not detect a failure when the motor current is within a predetermined range.

11. The electric power steering apparatus according to claim 1, wherein the relation between the steering torque and the motor current is established so as to authorize driving of the motor when the motor current is small.

12. The electric power steering apparatus according to claim 1, wherein the failure detecting means does not detect a failure when the steering torque is within a predetermined range.

13. The electric power steering apparatus according to claim 1, wherein the failure detecting means reduces output of the motor when a failure is detected.

14. The electric power steering apparatus according to claim 1, wherein the failure detecting means concludes definitely that there is a failure when the failure is continuously detected for more than a certain time, and reduces output of the motor when occurrence of the failure is definitely concluded.

15. The electric power steering apparatus according to claim 13, wherein the failure detecting means interrupts output of the motor when the motor current is reduced.

16. The electric power steering apparatus according to claim 13, wherein the failure detecting means reduces gradually output of the motor.

17. The electric power steering apparatus according to claim 1, wherein the apparatus is provided with a memory for storing and holding results detected by the failure detecting means.

18. The electric power steering apparatus according to claim 17, wherein the memory is a nonvolatile memory.

* * * * *